US010771737B2

(12) United States Patent
Mercredi et al.

(10) Patent No.: US 10,771,737 B2
(45) Date of Patent: Sep. 8, 2020

(54) TRANSITIONING A TELEPHONE NETWORK PHONE CALL TO A VIDEO CALL

(71) Applicant: Facebook, Inc., Menlo Park, CA (US)

(72) Inventors: Dwayne B. Mercredi, Kirkland, WA (US); Pavol Mravec, Redmond, WA (US)

(73) Assignee: FACEBOOK, INC., Menlo Park, CA (US)

( * ) Notice: Subject to any disclaimer, the term of this patent is extended or adjusted under 35 U.S.C. 154(b) by 404 days.

(21) Appl. No.: 15/371,620

(22) Filed: Dec. 7, 2016

(65) Prior Publication Data
US 2018/0160074 A1    Jun. 7, 2018

(51) Int. Cl.
  H04N 7/14 (2006.01)
  H04L 29/06 (2006.01)
  H04L 12/58 (2006.01)

(52) U.S. Cl.
  CPC ............. H04N 7/147 (2013.01); H04L 51/32 (2013.01); H04L 65/1083 (2013.01)

(58) Field of Classification Search
  CPC combination set(s) only.
  See application file for complete search history.

(56) References Cited

U.S. PATENT DOCUMENTS

| 8,644,886 B1 * | 2/2014 | Delaney ................. H04M 3/02 455/415 |
| 2014/0111596 A1 * | 4/2014 | Grevers, Jr. ...... H04M 3/42042 348/14.01 |
| 2016/0021336 A1 * | 1/2016 | Abbott .............. H04M 1/72572 348/14.02 |

* cited by examiner

Primary Examiner — Phung-Hoang J Nguyen
(74) Attorney, Agent, or Firm — Keller Jolley Preece

(57) ABSTRACT

The present disclosure relates to systems, methods, and devices for transitioning phone calls to video calls. Specifically, one or more embodiments allow users to transition from an active phone call over a telephone network to a video call. One or more embodiments determine a first user identifier for a first user and a second user identifier for a second user. Additionally, the systems and methods identify user client devices actively performing the phone call based on the user identifiers and provide an option to the identified client devices to switch the phone call to the video call. Transitioning the phone call to a video call involves generating a null connection prior to selection of the option to transition to the video call and then streaming media between the client devices using the generated null connection in response to selection of the option.

20 Claims, 12 Drawing Sheets

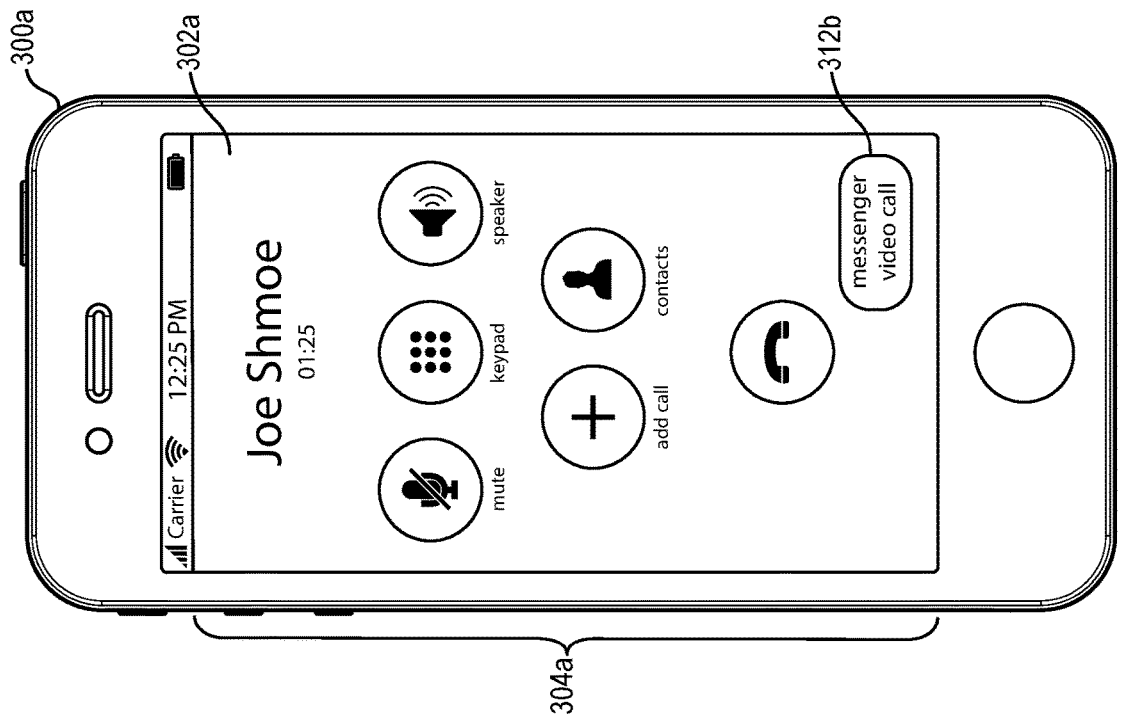
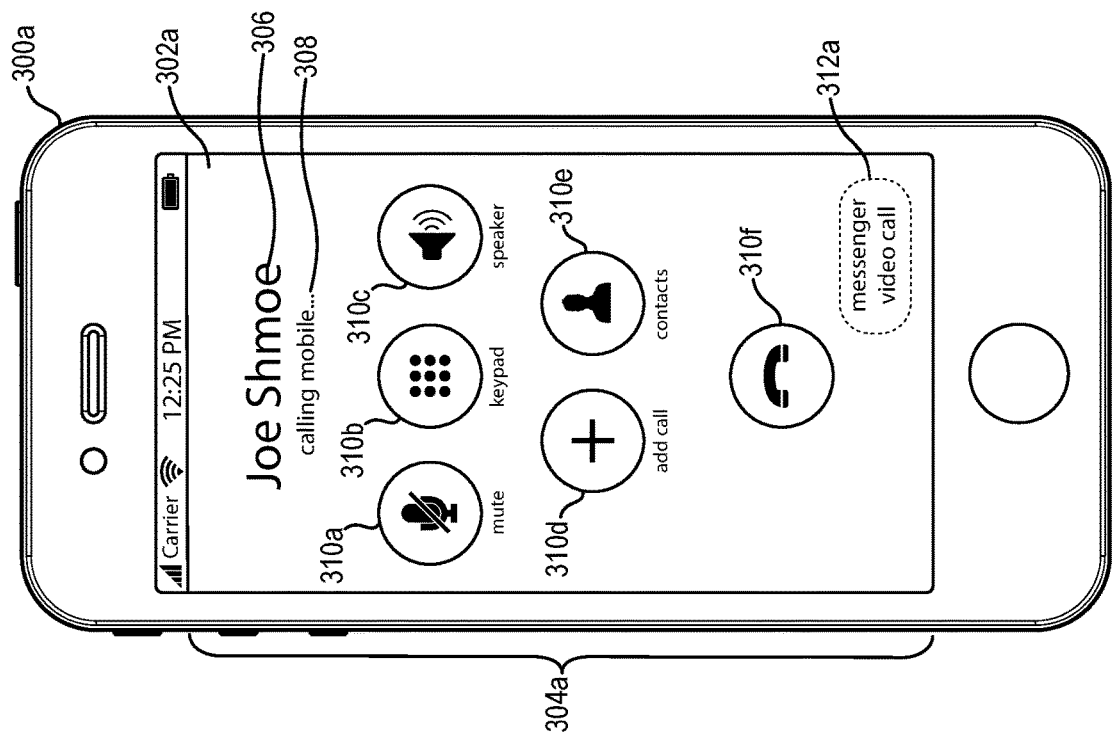
Fig. 3B
Fig. 3A

TRANSITIONING A TELEPHONE NETWORK PHONE CALL TO A VIDEO CALL

BACKGROUND

Improvements in computing devices, as well as in data transfer speeds and capabilities, provide an increasing number and variety of methods of communication between users. Specifically, many computing devices such as smartphones allow users to engage in video calls or video conferences with other users over wireless networks. Video calls provide users with a more personal interaction and more types of interactions than standard phone calls over a telephone network due to the ability to see each other while conversing.

Although some conventional communication systems allow users to participate in video calls with each other, such systems suffer from a number of drawbacks, disadvantages, and inefficiencies with regard to initiating and conducting video calls between users. Specifically, some conventional systems allow users to transition from a standard phone call to a video call. Such systems, however, terminate the standard phone call when a user initiates a request to transition to a video call with another user. If the other user declines the video call, or if the video call fails for any reason, the standard phone call remains terminated, and the user must then manually initiate a new phone call to continue conversing with the other user. Thus, conventional systems interrupt the conversation flow between users when transitioning from a standard phone call to a video call. These and other disadvantages exist with respect to conventional video call systems.

SUMMARY

One or more embodiments described herein provide benefits and/or solve one or more of the foregoing or other problems in the art with systems and methods to allow users to transition from a phone call over a telephone network (e.g., a public switched telephone network) to a video call. In particular, the systems and methods provide an option for users in an active phone call to switch from the phone call to a video call between the users. In one or more embodiments, the disclosed system receives an indication of a phone call between a first user using a first client device and a second user using a second client device. The system determines user identifiers for the first user and the second user and then identifies the corresponding client devices. Additionally, the system provides an option to the identified client devices to allow one or both users to switch from the phone call to a video call. Thus, the systems and methods can use information from the phone call and from the users' devices to unobtrusively provide an option to switch from the phone call to a video call on users' devices.

One or more embodiments of the systems and methods also allow the users to switch from the phone call on the telephone network to a video call within a messaging application using a corresponding electronic messaging system. Specifically, during the phone call, the system establishes a null video call connection between the identified client devices. The null video call connection includes information that allows the system to begin streaming video between the client devices using the null video call connection when a user selects the option to switch from the phone call over the telephone network to the video call within the messaging application. By generating the null video call connection prior to providing the option to switch from the phone call to a video call, the system provides a smooth transition from the phone call to the video call in response to one or more of the users selecting the option.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

A more particular description of the features briefly described above will be rendered by reference to specific embodiments thereof that are illustrated in the appended drawings. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which:

FIGS. 3A-3G illustrate example graphical user interfaces for transitioning a phone call to a video call in accordance with one or more embodiments;

DETAILED DESCRIPTION

Figure 1:
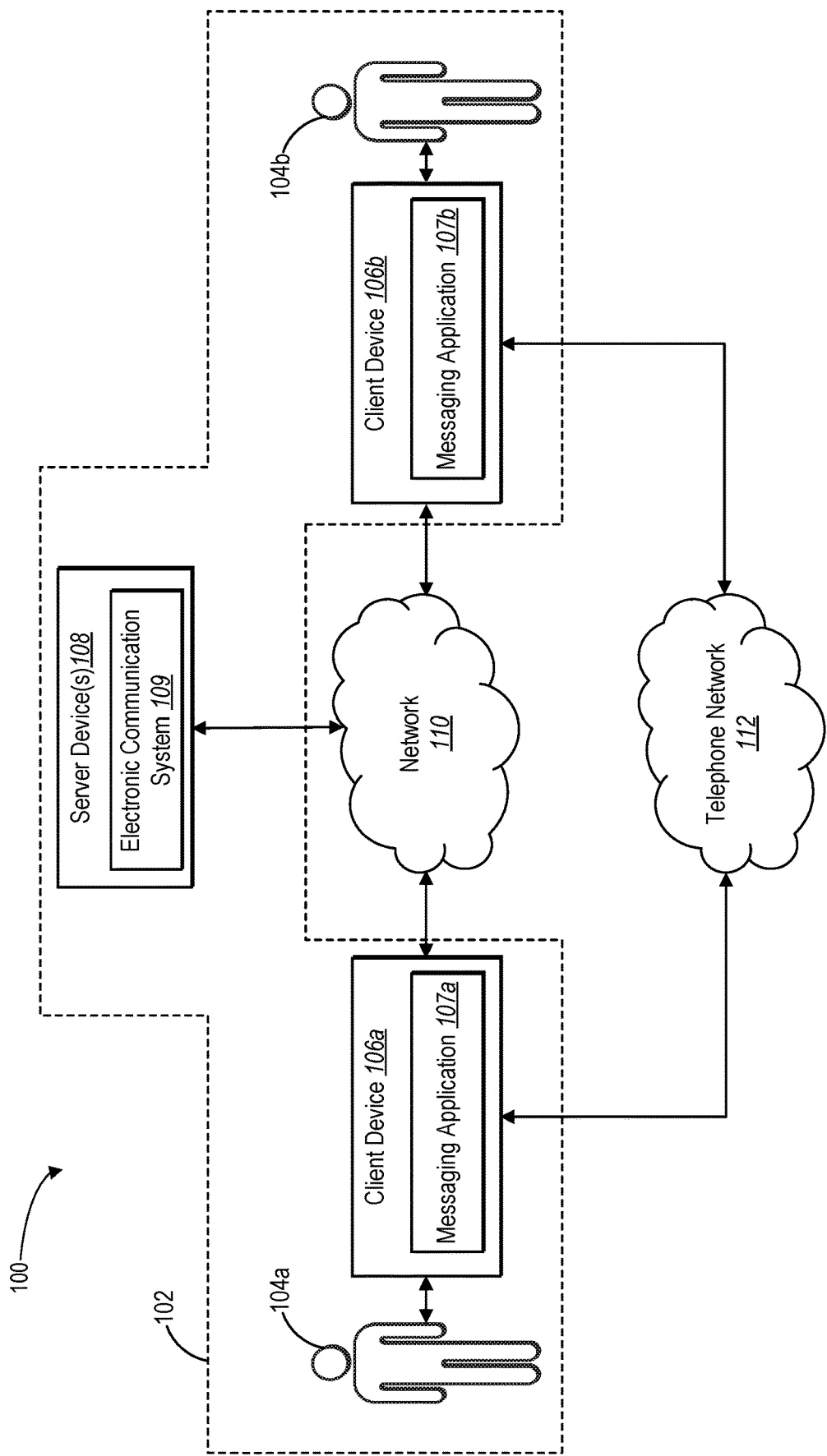
FIG. 1 illustrates a schematic diagram of an environment in which a communication system operates in accordance with one or more embodiments.

Embodiments of the present disclosure provide a communication system that allows users to engage in video calls with each other. In particular, one or more embodiments provide a communication system for seamlessly transitioning a phone call over a telephone network (e.g., public switched telephone network) to a video call (e.g., over a data network, such as the Internet). To transition the phone call to a video call, in some embodiments the communication system obtains user identification information and device identification information to determine who is participating in the phone call and which client devices are being used for the phone call. Using this information, the communication system can then establish a null video call connection between the users using the identified client devices. The communication system then prompts the users by providing an option to switch the phone call to a video call. In response to a selection to transition to a video call, the communication system terminates the phone call and then utilizes the previously established null video call connection to initiate the video call.

In one or more embodiments, the communication system allows users to transition a phone call over a telephone network to a video call. Specifically, the communication system allows users who are actively engaged in a phone call over a telephone network to switch the phone call to a video call over a data connection. For example, the communication system can transition from the phone call within a phone application on the client devices to the video call within another application (e.g., a messaging application or a social networking application) on the client devices. Thus, the communication system provides a way for users to seamlessly transition from the phone call to the video call while not significantly interrupting the ongoing communication between the users.

As previously mentioned, the communication system described herein provides advantages over conventional communication systems. The communication system allows users to switch from a phone call over a telephone network to a video call over a data network so that the video call is essentially an extension of the phone call. As such, the communication system allows for the transition between the phone call to the video call without requiring users to end the phone call in a first application and begin the video call within a second application on the users' devices. The communication system also allows users to transition from a phone call to a video call across different operating systems by leveraging the capabilities of server devices of a communication system (e.g., an electronic messaging system or social networking system) that provide video messaging services to the client devices.

Additionally, by establishing a null video call connection between the client devices prior to receiving requests from the users to transition to the video call, the communication system improves the performance of the client devices. Specifically, the communication system reduces the amount of delay on the devices when switching to the video call by relying on a previously established null video call connection. Thus, the communication system reduces the processing load on the client devices during the transition to make for a smooth, seamless transition.

FIG. 1 is a schematic diagram illustrating an environment 100 that includes a communication system 102 to facilitate communication between two or more users. An overview of the environment 100 is described in relation to FIG. 1. Thereafter, a more detailed description of the components and processes of the communication system 102 and other components within the environment 100 are provided in relation to the remaining figures.

As illustrated by FIG. 1, the communication system 102 allows users to communicate with each other via respective client devices. Specifically, the communication system 102 allows a first user 104a to engage in a communication with a second user 104b using a first client device 106a and a second client device 106b, respectively (collectively referred to herein as "client devices 106"). As further illustrated in FIG. 1, and as described in more detail in additional figures, the communication system 102 allows the client devices 106 associated with the users 104a, 104b to communicate with server device(s) 108 via a network 110.

Furthermore, the server device(s) 108 include an electronic communication system 109 to facilitate communication between the client devices 106. As used herein, the term "electronic communication system" refers to a system that facilitates communications between two or more users. For instance, an electronic communication system can include a messaging system or a social networking system on the server device(s) 108 that communicates with applications running on the client devices 106 to allow the client devices 106 to exchange messages or data (e.g., video/audio data) in connection with a video call.

The first client device 106a and the second client device 106b can also include messaging applications 107a, 107b. As used herein, the term "messaging application" refers to an application that facilitates one or more methods of electronic communication between two or more users. For example, a messaging application can include an application that communicates with the electronic communication system 109 to allow a user to engage in a video call with another user. Additionally, a messaging application can communicate with other applications running on a client device, such as a phone application, to determine when the user client device is performing a phone call, and to provide an option to the user to switch from the phone call using the phone application to a video call using the messaging application. In one or more embodiments, a messaging application includes a social networking application that allows users to communicate and form social network relationships with each other. A messaging application can also be device and/or system agnostic to allow users with different types of client devices and/or using different operating systems to communicate via the electronic communication system 109.

In addition, the environment 100 can include a telephone network 112 connecting the client devices 106. As used herein, the term "telephone network" refers to a communication network associated with telephone service carriers. Specifically, telephone network allows users to contact and communicate with other users using telephone numbers provided by a telephone service provider. In some embodiments, the term "telephone network" refers to the public switched telephone network ("PSTN"), including the corresponding networks, infrastructure, and services. In other embodiments, the term telephone network can include any other telephone network or portion thereof. Thus, the client devices 106 can communicate with each other via the telephone network 112 and also communicate with the server device(s) 108 and with each other via the network 110.

Although FIG. 1 illustrates a particular arrangement of the client devices, the server device(s) 108, the network 110, and the telephone network 112, various additional arrangements are possible. For example, one or both of the client devices 106 can communicate directly with the server device(s), bypassing the network 110. In another example, the telephone network 112 and the server device(s) 108 can be part of the same system, such that the server device(s) 108, the network 110, and/or the telephone network 112 share one or more of the same resources.

As briefly mentioned previously, the communication system 102 allows users to switch an active phone call to a video call. FIG. 1 shows that the first user 104a and the second user 104b can use the first client device 106a and the second client device 106b, respectively, to engage in phone calls with one another via the telephone network 112. To illustrate, the first user 104a can place a call using the first client device 106a to the second user 104b and one or more telephone service providers can facilitate the call using the telephone network 112. The second user 104b can then answer the call using the second client device 106b and participate in a phone call with the first user 104a.

In one or more embodiments, the client devices 106 can be devices capable of communicating with a telephone network 112 to perform phone calls. For example, the client devices 106 can include mobile phones and/or handheld computing devices (e.g., smartphones or tablets) that can communicate with the network 110 and the telephone network 112 using one of a plurality of different telephone communication technologies. The client devices 106 can include other types of client devices, as may serve a particular embodiment.

Additionally, the client devices 106 are able to communicate with the server device(s) 108 using a data connection. To illustrate, the electronic communication system 109 on the server device(s) 108 allows the users 104a, 104b to communicate with each other in a video call by establishing a data connection between the client devices 106 via the server device(s) 108. In one or more embodiments, the network 110 includes the Internet or World Wide Web. The network 110, however, can include one or more private and/or public networks that use various communication technologies and protocols, as further described below with reference to FIG. 7.

As described herein, the electronic communication system 109 can allow client devices running a variety of software applications or systems to engage in video calls. According to one or more embodiments, the first client device 106a includes a first operating system and the second client device 106b includes a second operating system. The first operating system can be different than the second operating system. Alternatively, the first operating system can be the same as the second operating system. Thus, the electronic communication system 109 can provide the capability to switch from phone calls to video calls irrespective of the operating systems or devices of the users.

Figure 8:
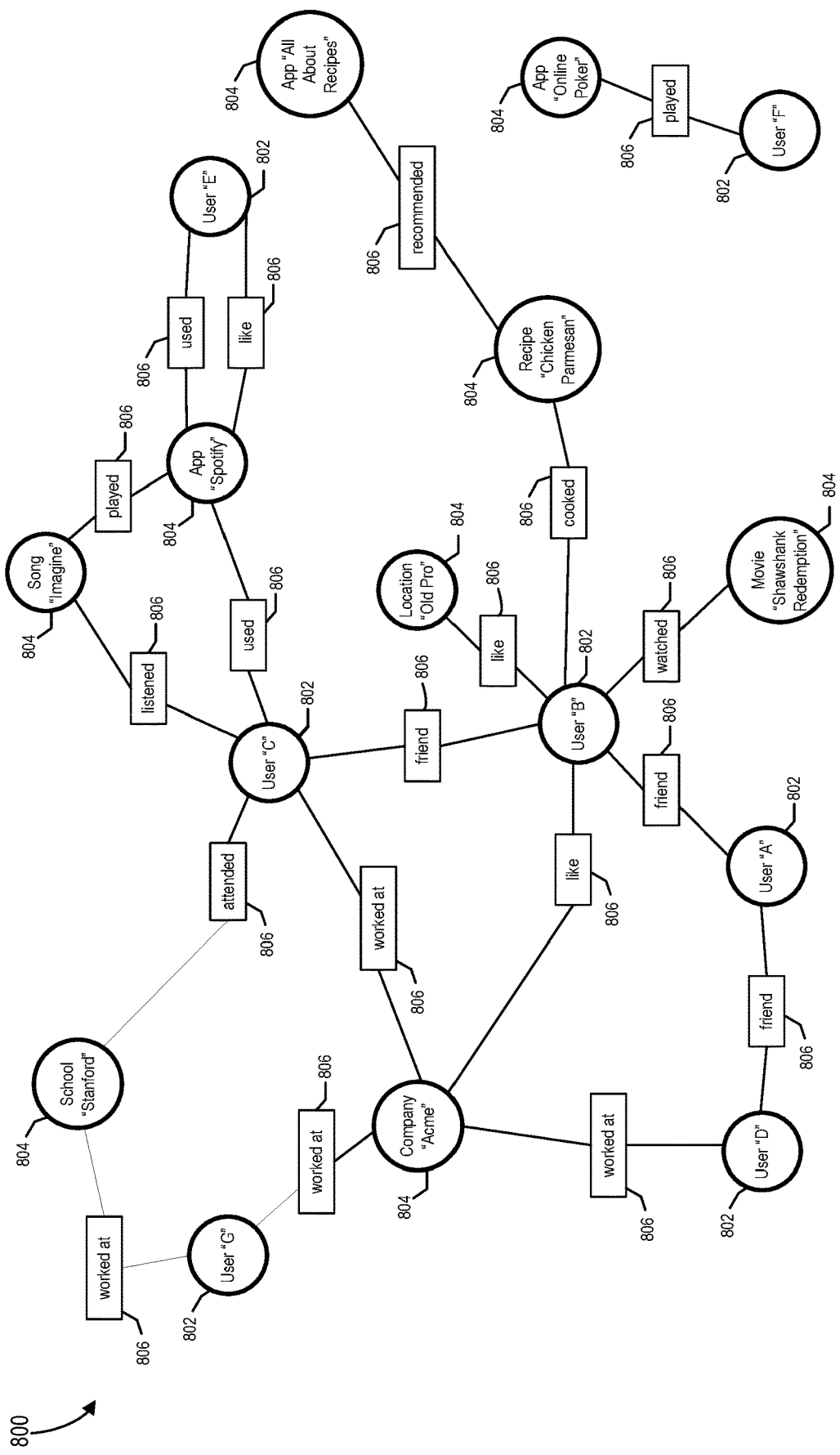
FIG. 8 illustrates an example social graph for a social-networking system in accordance with one or more embodiments.

In one or more embodiments, the electronic communication system 109 maintains information about users of the communication system 102 (e.g., user accounts of a social networking system, as described in more detail with respect to FIG. 8). The electronic communication system 109 use the information about the users and information about a phone call over the telephone network 112 to identify users actively engaged in the phone call. For example, the electronic communication system 109 can use phone numbers in a phone call to determine identities of users in the phone call.

The electronic communication system 109 also use information about users to identify the client devices 106 in the phone call. To illustrate, the electronic communication system 109 can use the identities of the first user 104a and the second user 104b based on phone numbers in the phone call to identify the first client device 106a and the second client device 106b. For example, the electronic communication system 109 can communicate with a plurality of client devices associated with the first user 104a to determine that the first client device 106a is in an active phone call. Additionally, the electronic communication system 109 can determine that the first client device 106a is in a phone call based on the identity of the first user 104a, and then based on information received from the first client device 106a about the phone call, identify the second user 104b and the second client device 106b.

In one or more embodiments, the electronic communication system 109 also communicate with the messaging applications 107a, 107b on the client devices 106 to provide information and notifications to the client devices 106. Specifically, the electronic communication system 109 can provide notifications to the first client device 106a and/or the second client device 106b in response to identifying the client devices 106 in the active phone call. For example, the electronic communication system 109 can provide an option to the client devices 106 to switch to a video call. Additionally, in response to receiving a request to switch the phone call to a video call, the electronic communication system 109 can facilitate streaming the video call between the client devices 106 via the network 110.

Figure 2A:
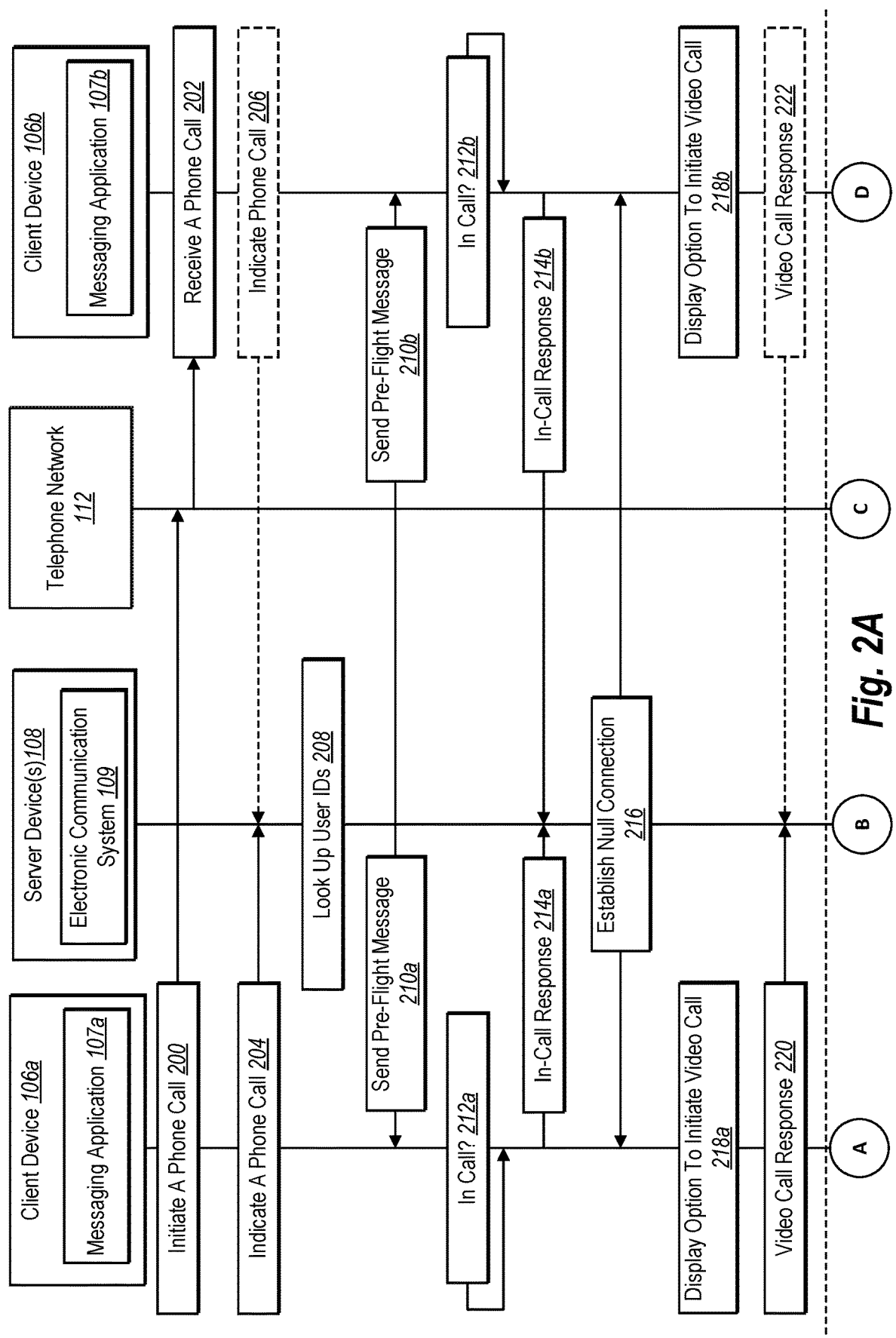
FIGS. 2A-2B illustrate a sequence-flow diagram illustrating interactions as part of a call transition process in accordance with one or more embodiments.
Figure 2B:
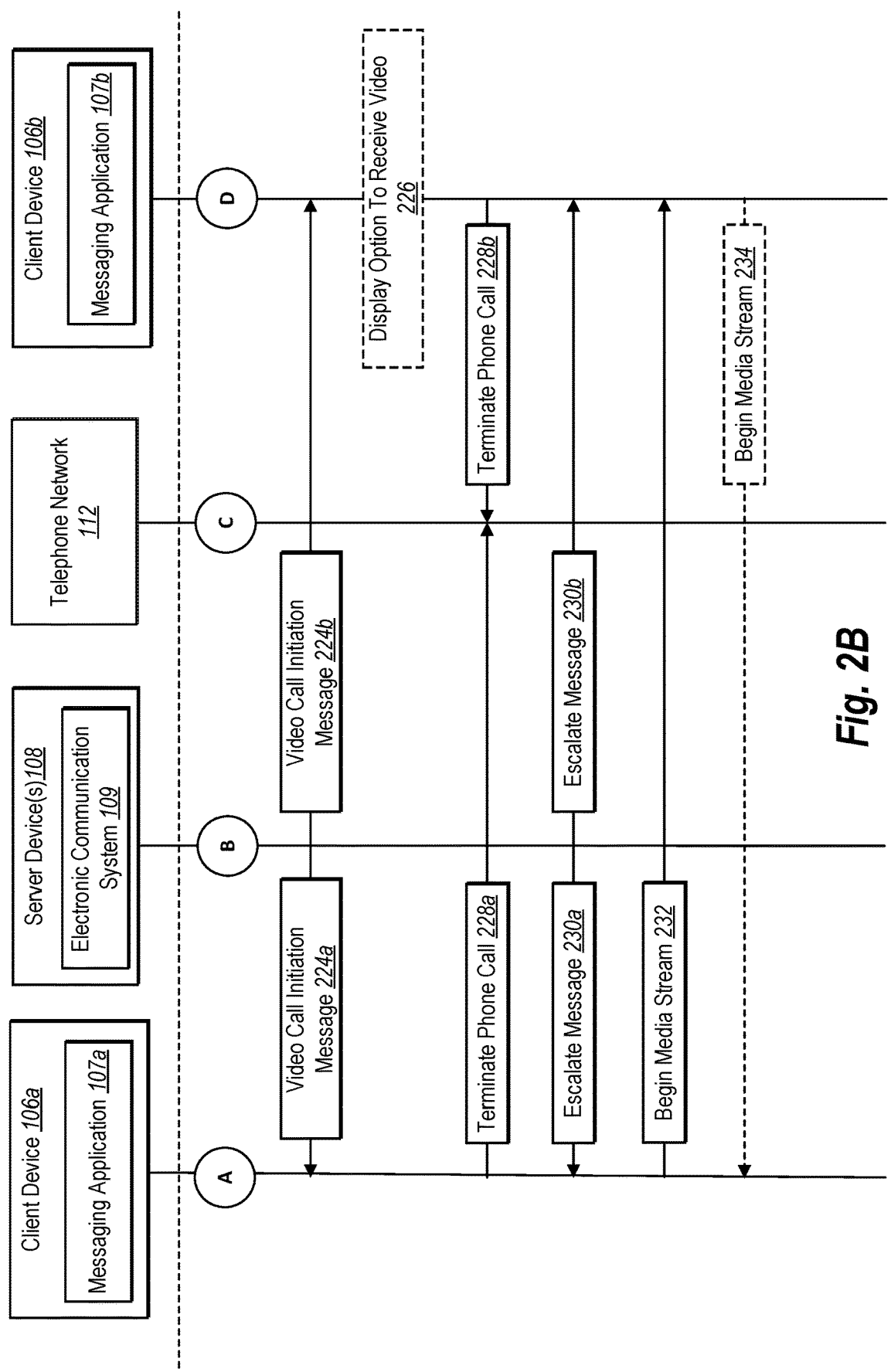

As discussed, the systems and components explained above with reference to FIG. 1 allow users to easily and seamlessly transition from a phone call over a telephone network 112 to a video call via the server device(s) 108. FIGS. 2A-2B illustrate example process diagrams of one or more example embodiments of processes implemented by the communication system discussed above. Consistent with communication system illustrated in FIG. 1, FIGS. 2A-2B illustrate (according to a sequence flow of operations) a first client device 106a including a messaging application 107a, a second client device 106b including a messaging application 107b, server device(s) 108 including an electronic communication system 109, and a telephone network 112.

In one or more embodiments, a process for transitioning a phone call over a telephone network 112 to a video call begins with the first user initiating 200 a phone call with the second user. Specifically, as FIG. 2A illustrates, the first client device 106a associated with the first user sends a request to initiate the phone call between the first user and the second user to the telephone network 112. The request can be through the first user's telephone provider/carrier and using a corresponding phone technology. For example, the first client device 106a can be a mobile device (e.g., a smartphone) that communicates with the telephone network 112 using a wireless cellular technology such as code division multiple access (CDMA) or global system for mobile communication (GSM).

After the telephone network 112 receives the request to initiate the phone call between the first user and the second user, the telephone network 112 can attempt to connect the phone call with the second client device 106b associated with the second user. In particular, the second client device 106b receives 202 the request to initiate the phone call, and the second user can accept, reject, or ignore the request. If the second user accepts the phone call, the first client device 106a and the second client device 106b connect to each other via the telephone network 112 for the duration of the phone call.

In one or more embodiments, while the first user and the second user are in the phone call, the first client device 106a indicates 204 the phone call to the server device(s) 108. Specifically, the messaging application 107a on the first client device 106a indicates the phone call to the electronic communication system 109 on the server device(s) 108 by sending information about the phone call to the electronic communication system 109. For example, the first client device 106a can send a phone number associated with the first client device 106a to the server device(s) 108 in response to the messaging application 107a on the first client device 106a recognizing the phone call. Optionally, the messaging application 107b on the second client device 106b can indicate 206 the phone call to the electronic communication system 109 on the server device(s) 108 by sending a phone number associated with the second client device 106b to the server device(s) 108. Alternatively, the first client device 106a can send both phone numbers to the server device(s) 108, such that the second client device 106b does not send any information to the server device(s) 108.

Using the phone number from the client devices in connection with the first user and the second user, the electronic communication system 109 then looks up 208 user identifiers (or "user IDs") for the users. In particular, the electronic communication system 109 can look up phone numbers in a database to identify corresponding user IDs based on mappings between the user IDs and phone numbers that are registered with the electronic communication system 109. For example, the electronic communication system 109 looks up the phone number associated with the first client device 106a in a user account database to determine whether the phone number is registered with a user ID. If the phone number is registered with a user ID, the electronic communication system 109 determines the user account for the user ID. The user account can include a social networking account, such as a messaging account associated with a messaging system that allows the user to communicate with a plurality of other users registered with the messaging system.

In one or more embodiments, if either the first user or the second user has not previously registered a phone number with a user account, the electronic communication system 109 can obtain a user ID for the second user based on information from the first client device 106a. Specifically, the electronic communication system 109 can request information about the second user from the first client device 106a in connection with determining the user identity of the first user. For example, the electronic communication system 109 can identify the user account of the first user and then obtain the second user's identity from the first client device 106a. For example, the first client device 106a can look up the user's identity based on information stored at the first client device 106a.

After determining the user identities with the user IDs, the server device(s) 108 then identify the client devices actively performing the phone call. In particular, each user may have one or more client devices associated with a user account. To identify the client device involved in the phone call, the electronic communication system 109 determines each client device associated with a user account. To illustrate, the electronic communication system 109 sends 210 a "pre-flight message" to the first client device 106a and the second client device 106b based on identifying the user accounts of the first user and the second user. A pre-flight message includes a message that requests that each client device check if the client device is currently involved in a phone call. In at least some embodiments, the electronic communication system 109 send a pre-flight message to the first client device 106a and the second client device 106b asynchronously (e.g., to the first client device 106a first and then to the second client device 106b).

If a user account is associated with a plurality of client devices, the electronic communication system 109 determines whether each client device from the plurality of client devices is involved in a phone call. For example, a user account may be associated with a smartphone and a tablet owned by a user. To associate a client device with a user account, a user may log into the user account on the client device such that the client device (e.g., a device identifier) is stored with the user account. When the electronic communication system 109 attempts to identify the client devices associated with the user account, the electronic communication system 109 send a pre-flight message to each of the client devices. If the electronic communication system 109 are unable to communicate with any of the user's client devices for any reason (e.g., not logged into the messaging application, uninstalled the messaging application, offline), the electronic communication system 109 can determine that video calling for the user is unavailable.

In one or more embodiments, each client device that receives a pre-flight message from the electronic communication system 109 performs a check 212a, 212b to determine whether the client device is involved in a call. In particular, the first client device 106a performs an in-call check to determine whether the first client device 106a is involved in (i.e., performing) a phone call. Similarly, the second client device 106b performs an in-call check to determine whether the second client device 106b is involved in a phone call. To illustrate, a messaging application can receive the pre-flight message from the electronic communication system 109 and determine whether the corresponding client device is in a phone call. The messaging application may receive permission from the client device to gain access to phone call information at the time of installation or after installation upon granting of permission by a user.

After determining that the first client device 106a is in the phone call, the first client device 106a (e.g., the messaging application 107a) sends 214a an in-call response to the electronic communication system 109. Similarly, the second client device 106b (e.g., the messaging application 107b) sends 214b an in-call response to the electronic communication system 109 in response to determining that the second client device 106b is in the phone call. The in-call responses indicate to the electronic communication system 109 that the client devices are in a phone call. For example, the in-call responses can include an application ID (i.e., an ID for the installed messaging application on each client device), a device ID, and an affirmative indication that the client devices are in a phone call. Thus, the electronic communication system 109 can identify the client devices that the first user and the second user are using to perform the phone call.

In one or more embodiments, identifying the client devices that are currently involved in a phone call between two or more users allows the electronic communication system 109 to determine that the phone call can transition to a video call. In particular, the electronic communication system 109 can initiate a video call process by establishing 216 a null video call connection between the first client device 106a and the second client device 106b. As used herein, the terms "null video call connection" and "null connection" refer to an established connection between two or more devices in preparation for streaming media between the devices. For example, the electronic communication system 109 can generate a null connection between the first client device 106a and the second client device 106b such that the connection has information associated with a video call between the client devices (e.g., an application ID, a device ID, and a video upgrade indicator), but with no media streaming between the client devices. Because the null connection may not have media, the first client device 106a and the second client device 106b receive information about the null connection without displaying anything to the users. Alternatively, the electronic communication system 109 can establish the null connection, capture a preview image (e.g. a thumbnail) at the first user on the first client device 106a, and send the preview over the null connection to the second client device 106b for displaying on the second client device 106b.

When the electronic communication system 109 establishes the null connection between the first client device 106a and the second client device 106b, the first client device 106a and the second client device 106b display 218a, 218b an option to initiate a video call. Specifically, the first client device 106a and the second client device 106b can recognize the established null connection and display a notification on the respective client device. For example, the notification can include, within a user interface of the corresponding client device, a selectable option for transitioning the phone call to a video call. Alternatively, if the electronic communication system 109 fails to establish the null connection between the first client device 106a and the second client device 106b, the electronic communication system 109 can prevent the display of the selectable option for transitioning the phone call to a video call.

In one or more embodiments, when the first user selects the option to transition the phone call to a video call, the first client device 106a sends 220 a video call response to the electronic communication system 109. The video call response includes an indication to the server device(s) 108 that the first user wants to transition the phone call to a video call. The video call response from the first client device 106a can include information about the client devices, such as the application ID, the device ID, the user ID in connection with the first user and the first client device 106a.

Optionally, the second user can also select the option to transition the phone call to a video call, causing the second client device 106b to send 222 a video call response to the electronic communication system 109. The video call response from the second client device 106b can include information about the second user and the second client device 106b, including the application ID, the device ID, and the user ID. A video call response from both the first client device 106a and the second client device 106b can indicate to the electronic communication system 109 to stream video from each client device to the other client device.

Alternatively, the second user may not select the option to transition the phone call to a video call. For example, the second user may not want to use data to stream video to the first user or may not be in a position to stream video to the first user. As a result, the second user can choose not to select the option. If the second user chooses not to select the option, the second client device 106b may not send a video call response to the electronic communication system 109, or may send a video call response that indicates that the second user does not want to transmit video to the first client device 106a. Thus, the server client device(s) may determine that only the first client device 106a has responded positively to initiating a video call. Additionally, the first client device 106a can send additional information (e.g., the user ID of the second user) to the electronic communication system 109 in case the second user does not respond to the electronic communication system 109.

In one or more embodiments, after receiving the video call response from the first client device 106a and/or the second client device 106b, the electronic communication system 109 sends 224a, 224b a video call initiation message to the first client device 106a and the second client device 106b, as illustrated in FIG. 2B. In particular, the electronic communication system 109 sends a message to the client devices to initiate the video call between the first user and the second user. If both users selected the option to transition the phone call to a two-way video call/stream, the video call initiation message includes a request to both client devices to begin a process for streaming video. If only one of the users selected the option to transition to a video call, the video call initiation message to the other client device can include a request to receive video, rather than to stream video. For example, if only the first client device 106a responded affirmatively to the electronic communication system 109 to initiate the video call, the video call initiation message to the first client device 106a will include a request to begin streaming video, and the video call initiation message to the second client device 106b will include a request to receive streaming video.

In response to receiving a request to receive streaming video, a client device displays an option to receive the video. For example, if the second user chooses not to stream video, the second client device 106b can still display an option to receive a one-way video call from the first user. To illustrate, the second client device 106b can display an option in a user interface during the phone call to allow the user to transition the phone call to a one-way video call. Although the one-way video call includes video from one of the client devices to the other client device, a one-way video call may still allow for a two-way audio call via the electronic communication system 109.

Alternatively, the first user can select the option at the first client device 106a and send a request to transition to a video call via the electronic communication system 109. The second client device 106b can display 226 an option to the second user to allow the second user to accept the request. Upon selection of the request, the second client device 106b can send a video call response to the electronic communication system 109 to indicate to the server device(s) 108 to begin the transition to the video call. As such, the electronic communication system 109 may not require both users to select the option to transition to the video call, but may receive the request to transition from one of the client devices and then an acceptance of the request from the other client device.

After receiving the video call initiation message, the first client device 106a and the second client device 106b terminate 228a, 228b the phone call. Specifically, the first client device 106a and the second client device 106b communicate with the telephone network 112 to terminate the phone call between the first client device 106a and the second client device 106b. For example, the video call initiation message can include a message that causes the client devices terminate the phone call prior to beginning the video call between the client devices.

After the phone call is terminated, the first client device 106a and the second client device 106b may send a termination indication to the electronic communication system 109 to indicate that the phone call is terminated. The electronic communication system 109 can wait until receiving the termination indication before determining that the phone call is terminated to verify that each of the client devices is operating properly and communicating with the electronic communication system 109. Thus, the electronic communication system 109 can verify that the phone call is terminated prior to causing the client devices to begin streaming media over the null connection that the electronic communication system 109 previously established between the client devices.

The electronic communication system 109 then sends 230a, 230b an escalate message to the first client device 106a and the second client device 106b. The escalate message can include a request by the electronic communication system 109 to begin streaming media over the previously established null connection. Because the null connection was previously established, the first client device 106a can begin 232 streaming media (e.g., audio and video) to the second client device 106b over the null connection. Optionally, if the second user also opted to transition to the video call, the second client device 106b can begin 234 streaming media to the first client device 106a over the null connection.

In one or more embodiments, transitioning the phone call to the video call can include switching from a first application on a client device to a second application. In particular, because the phone call and the video call occur over different connections (i.e., a telephone connection and a data connection), the client device can switch between different applications to handle each of the different connections. For example, the client device can perform the phone call within a phone application and the video call within a messaging application or a messaging application. Switching between the applications on the client devices can occur between terminating the phone call and beginning to stream the media over the null connection. In other embodiments, a single application on a client device can handle both types of connections, allowing the client device to transition between a phone call and a video call without switching applications.

As described above, a process for transitioning a phone call over a telephone network to a video call over a data connection is shown to include various steps on various devices. As one can appreciate, the protocols for different devices and operating systems can vary. Accordingly, the order and/or number of steps in the process can vary depending on the particular embodiment. For example, transitioning a phone call between devices using different operating systems can include other steps, or may be limited in the types of steps that one or more of the devices can perform. For instance, some operating systems may not be able to determine the phone number of the other person in a phone call, and may not provide access to the device's own phone number to other applications. As such, the client devices and/or server device(s) may obtain the phone numbers and user IDs differently than is described in relation to FIGS. 2A-2B.

Additionally, although FIGS. 2A-2B illustrate that the electronic communication system 109 at the server device(s) 108 identify the users participating in a phone call, other embodiments allow for a messaging application on one or both client devices 106 to identify the users on the phone call. Specifically, the messaging application 107a on the first client device 106a can determine that the first user is on call with a second user. The user identifiers may be tied to the particular devices and/or corresponding phone numbers, such that the messaging application 107a can then determine the user identifiers associated with the users involved in the call. For example, the messaging application 107a can cross-reference information associated with the call (e.g., a phone number) with an address book associated with the messaging application 107a to determine an identifier specific to the messaging application 107a for the second user 104b (e.g., form the second user's profile for the electronic communication system 109). Using the identifier of the second user 104b, the messaging application 107a can communicate with the electronic communication system 109 to initiate/establish the null video connection between the client devices 106 for the first user 104a and the second user 104b. The messaging application 107a can then prompt the first user 104a to convert the phone call to a video call using the established null video connection.

As will be described in more detail below, the components of the communication system as described with regard to FIG. 1, can provide, along and/or in combination with the other components, one or more graphical user interfaces. In particular, the components can allow a user to interact with a collection of display elements for a variety of purposes. In particular, FIGS. 3A-3G and the description that follows illustrate various example embodiments of the user interfaces and features of client applications that allow users to communicate with other users, and user interfaces that allow the users to transition from a phone call to a video call.

For example, FIGS. 3A-3C and 3E-3F illustrate various views of GUIs provided by a plurality of client applications at a first client device to allow a first user to communicate with other a second user. FIGS. 3D and 3G illustrate a plurality of client applications at a second client device to allow a second user to communicate with the first user. Specifically, FIGS. 3A-3G illustrate GUIs on a first client device 300a and a second client device 300b that allow a first user and a second user to transition from a phone call over a telephone network to a video call. Transitioning from a phone call to a video call can include switching between two different client applications (e.g., a phone application and a messaging application).

As stated, FIGS. 3A-3C and 3E-3F illustrate the first client device 300a as a touchscreen computing device. The touchscreen computing device may be a handheld device. As used herein the term "handheld device" refers to a device sized and configured to be held/operated in a single hand of a user. In additional or alternative example, however, the first client device 300a and/or the second client device 300b can be any suitable computing device, such as, but not limited to, a tablet device, a handheld device, larger wireless devices, laptop or desktop computer, a personal-digital assistant device, and/or any other suitable computing device that can perform phone calls over a telephone network and video calls using a data connection.

With reference to FIG. 3A, the first client device 300a includes a client application that allows a first user to engage in phone calls. For example, the client application can include a phone application 302a that facilitates phone calls over a telephone network with one or more additional users. The phone application 302a can include an application configured to communicate with the telephone network via a specific communication technology, as previously mentioned. The phone application 302a can allow the first user to communicate with other users based on a plan or service associated with a carrier or operator associated with the telephone network.

The phone application 302a can include a call interface 304a that allows a user to initiate and engage in phone calls. In particular, FIG. 3A illustrates a call interface 304a during a phone call between the first user and a second user. During a phone call, the call interface 304a can include information related to the phone call. For example, the call interface 304a can display an identifier 306 for the second user involved in the phone call. To illustrate, the call interface 304a can display a name, number, or user profile picture of the second user while the phone call is ongoing. The call interface 304a can also include a current status 308 of the phone call (e.g., call duration or connection status).

Additionally, the call interface 304a can include one or more options available to the first user while the first user is in the phone call. In particular, the options can allow the user to access one or more functions of the first client device 300a during the phone call. For example, the options can include a mute option 310a, a keypad option 310b, a speaker option 310c, an add call option 310d, a contacts option 310e, and an end call option 310f. Although the call interface of FIG. 3A illustrates a plurality of specific options, the call interface can include additional or fewer options. For example, the call interface 304a can vary based on the type of operating system on the client device, such that one or more options that are available when using a first operating system may not be available when using a second operating system.

As described above, the call interface 304a can include a plurality of options to perform various functions on the first client device. In one or more embodiments, the mute option 310a in the call interface 304a allows the first user to mute a conversation with the second user, such that the second user is unable to hear sound from the first user while the first user is muted. Selecting the keypad option 310b in the call interface 304a causes the first client device to display a keypad within the call interface. The speaker option 310c allows the first user to switch the audio in the phone call to a speaker mode. The add call option 310d allows the first user to add people to the phone call (e.g., three-way calling) or initiate a new call with another user while putting the second user on hold. Selecting the contacts option 310e can cause the first client device 300a to open a contact list for the first user as obtained from a stored list of contacts on the first client device 300a. Additionally, the call interface 304a can include an end call option 310f to end the phone call.

In one or more embodiments, at the beginning of the phone call, or at any time during the phone call, the first client device 300a can communicate with an electronic communication system associated with a video calling service. For example, the video calling service can be part of a social networking system that allows a user to create a user account and establish relationships with other users, as described in more detail in FIG. 8. To illustrate, the first client device 300a can include a messaging application with services that run in the background while the first client device 300a is involved in the phone call. Thus, the messaging application can communicate with the server device(s) to notify the server device(s) of the phone call.

After notifying the server device(s) of the phone call, the server device(s) identify the users involved in the phone call by determining user IDs of each of the users based on the phone numbers, as described previously in relation to FIGS. 2A-2B. Once the server device(s) have determined the user IDs, the electronic communication system communicates with client devices associated with the user IDs to identify the client devices involved in the phone call. For example, the electronic communication system communicates with the first client device to determine that the first client device 300a is involved in the phone call.

In one or more embodiments, prior to determining that the first client device is involved in the phone call, the first client device can display an option 312a to transition to a video call that is not selectable (e.g., grayed out), as illustrated in FIG. 3A. After making the determination that the first client device is involved in the phone call, the electronic communication system notifies the first client device 300a to allow the first user to transition the phone call to a video call. In particular, in response to receiving the notification from the electronic communication system, the first client device 300a can provide a selectable option to transition to a video call. For example, the first client device 300a can display the selectable option within the call interface 304a to transition to a video call based on the messaging application causing the first client device 300a to provide the option to the first user. To illustrate, the first client device 300a can change a previously non-selectable option 312a to a selectable option 312b, as illustrated in FIG. 3B. Additionally, as previously mentioned, the electronic communication system can establish a null connection between the first client device 300a and the second client device 300b in connection with a possible video call.

In one or more embodiments, the first client device 300a displays an option in the phone application 302a using permissions from the phone application 302a and the first client device, such that the option is displayed as part of the call interface 304a. In one or more alternative embodiments, the first client device 300a displays the option as a pop-up notification or dropdown notification as a notification from the operating system. In yet other embodiments, the first client device 300a displays the option as an overlay on top of the phone application 302a at any location in the call interface. Whether the first client device displays the option as part of the phone application 302a, as an operating system notification, or as an overlay on top of the phone application 302a may depend on the operating system and permissions given to the messaging application.

Additionally, the option to switch to a video call may display information about switching to the video call. For example, the option to switch to a video call can include information about the requesting application (i.e., the messaging application) and/or the users involved. To illustrate, the option can include an icon for the messaging application and text indicating a request to transition to a video call with the second user. Alternatively, the option can include only a button or other selectable element indicating that the user can transition to a video call in the messaging application. The type and/or amount of information displayed with the option can depend on the operating system or permissions associated with the messaging application.

In one or more embodiments, the electronic communication system can allow a user to switch devices when transitioning from the phone call to the video call. In particular, the electronic communication system can provide users with flexibility that allows the users to select a device different from the current device involved in the phone call to use for the video call. For example, the electronic communication system can send a notification to all of the client devices associated with a user ID or user account. Each of the client devices can display an option to transition the phone call to a video call.

If the user has another client device nearby, the user can select the option on the other client device to begin a process to transition the phone call to the different client device. By switching to another client device, the electronic communication system may establish a new connection with the other client device, rather than beginning to stream media over the previously established null connection with the client device involved in the phone call. Alternatively, the user can provide permission to the electronic communication system beforehand to establish null connections with all of the user's client devices when the electronic communication system receives an indication that any of the user's devices is involved in a phone call. Thus, the electronic communication system may be able to provide a seamless transition from a phone call to a video call on any of the user's client devices.

When the first user selects the option 312b to transition to a video call, the first client device 300a can display a notification associated with the request to transition to a video call. Specifically, FIG. 3C illustrates that a notification 314 in the call interface 304a that indicates that the first client device 300a is requesting permission from the second user to transition to the video call. In one or more embodiments, the first client device 300a sends a request to the second client device 300b via the electronic communication system in connection with the notification on the first client device. Additionally, the notification 314 can allow the first user to cancel the request if the first user accidentally selected the option or if the first user no longer wants to transition to the video call. The notification 314 can alternatively indicate to the first user that the first client device 300a is attempting to establish a data connection with the second client device 300b.

Figure 3D:
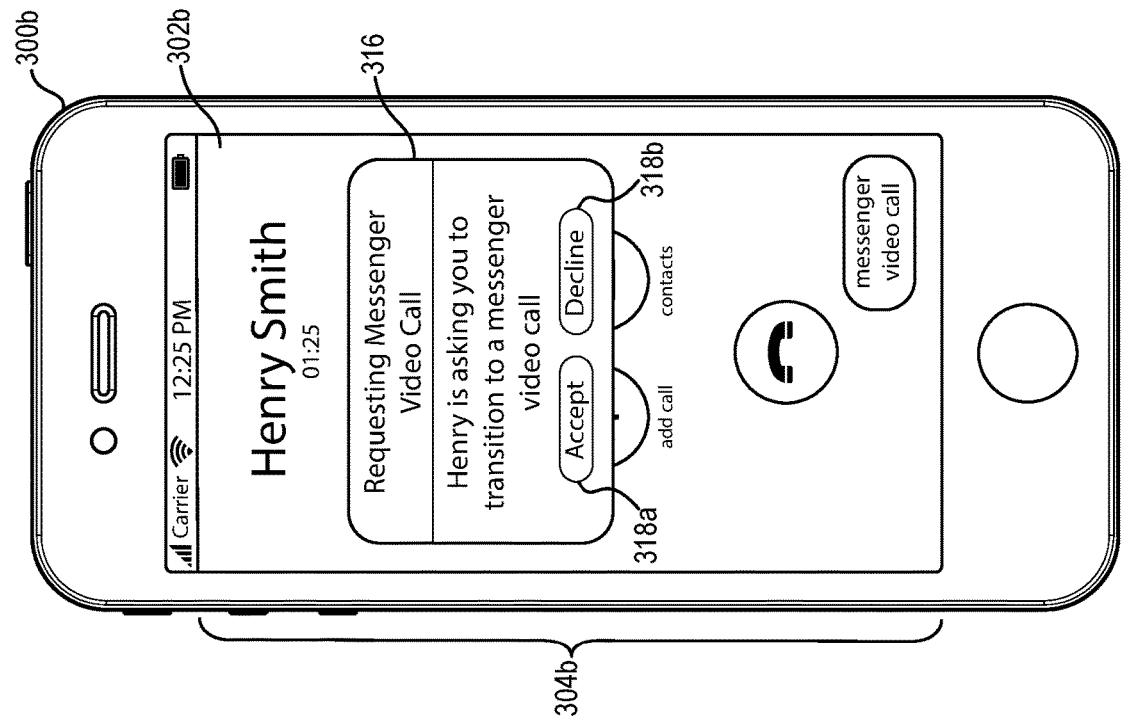
Figure 3C:
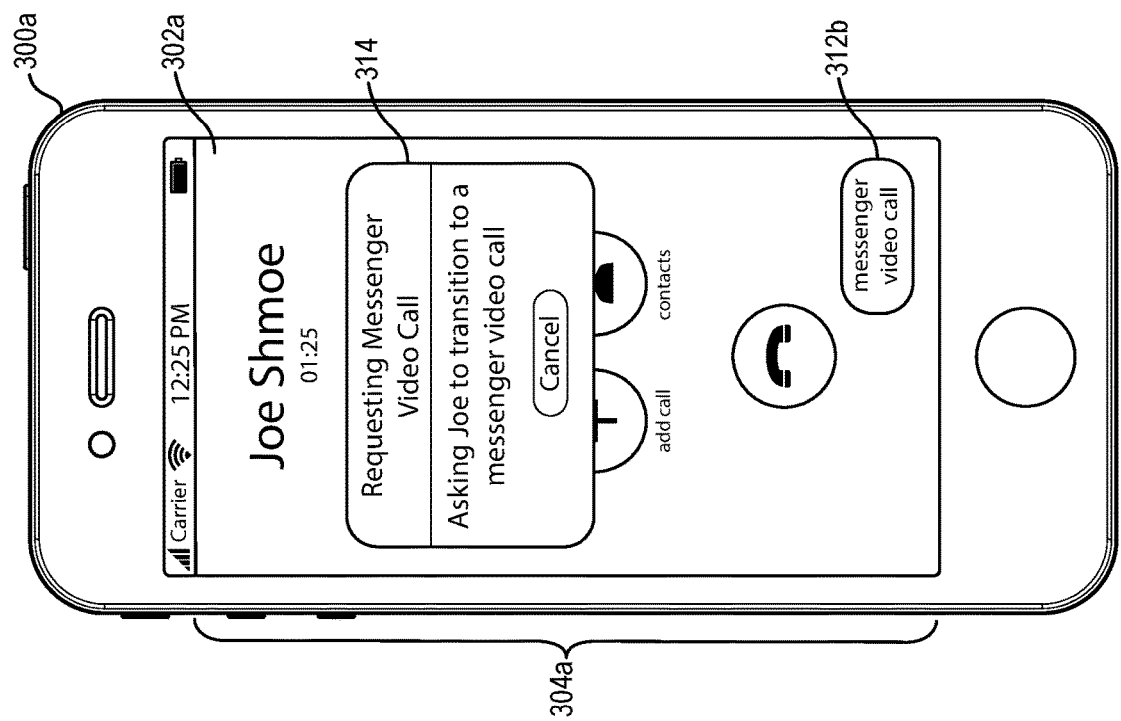
Figure 3F:
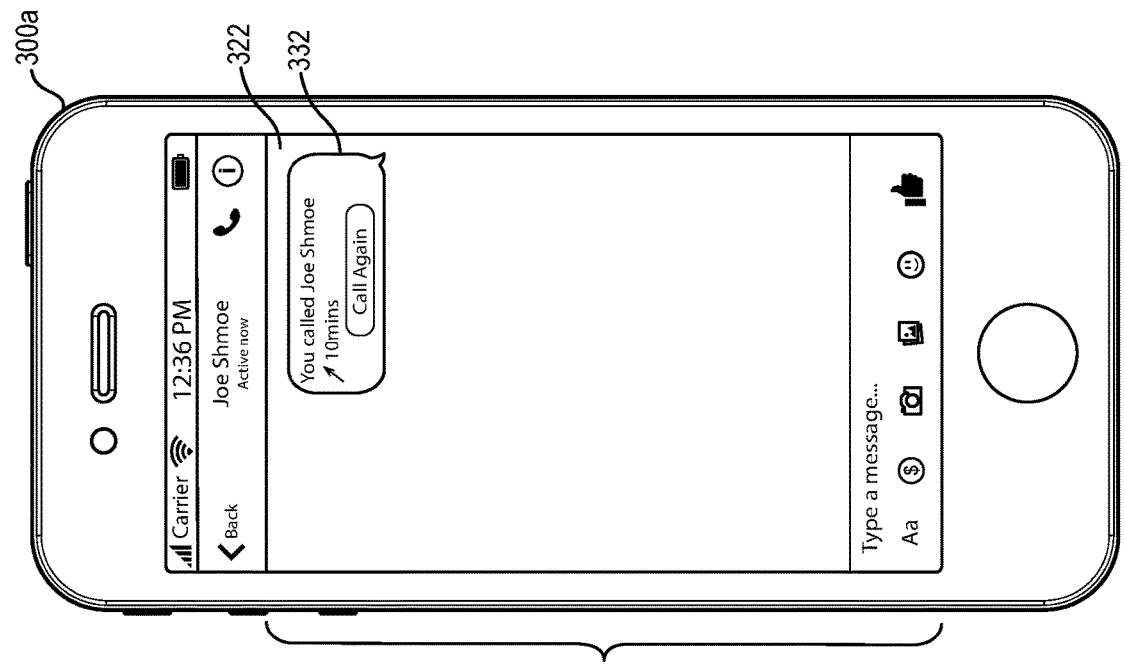

FIG. 3D illustrates a second client device 300b associated with the second user. In particular, the second client device 300b includes a phone application 302b with a call interface 304b, as with the first client device 300a. The second client device 300b can also include a handheld device such as a smartphone, or any device capable of engaging in phone calls via a telephone network and video calls using a data connection. As illustrate in FIG. 3D, when the first client device 300a requests to transition to the video call, the second client device 300b can receive and display a notification 316 that the first user wants to transition to a video call. Additionally, the notification can include options 318a, 318b that the second user can select to accept or decline the request to transition to a video call.

In one or more alternative embodiments, the electronic communication system can wait for both users to select an option to transition to a video call. If both users do not select the option to transition to the video call, the electronic communication system will not transition the phone call to a video call. For example, if the first user selects the option, but the second user does not select the option, the electronic communication system can cause the request to time out such that the first client device 300a and the second client device 300b remain connected via the telephone network. If both users select the option, the electronic communication system can automatically begin the transition to a video call.

In at least some embodiments, the electronic communication system can establish a one-way video call if only one of the users selects the option to transition to a video call and the other user accepts, but does not also select an option to transition to a video call from his/her end. The electronic communication system can alternatively provide additional options to the users to allow the users to customize the video call in a variety of ways. For example, the communication system can provide flexibility in establishing different types of media communications between the users by providing additional customization options with the option to transition to a video call. To illustrate, the communication system can allow the users to establish a two-way video call, a one-way video call, a one-way video call with two-way audio, etc., depending on whether both users select an option to transition to a video call and/or based on the selection of one or more additional options.

Figure 3E:
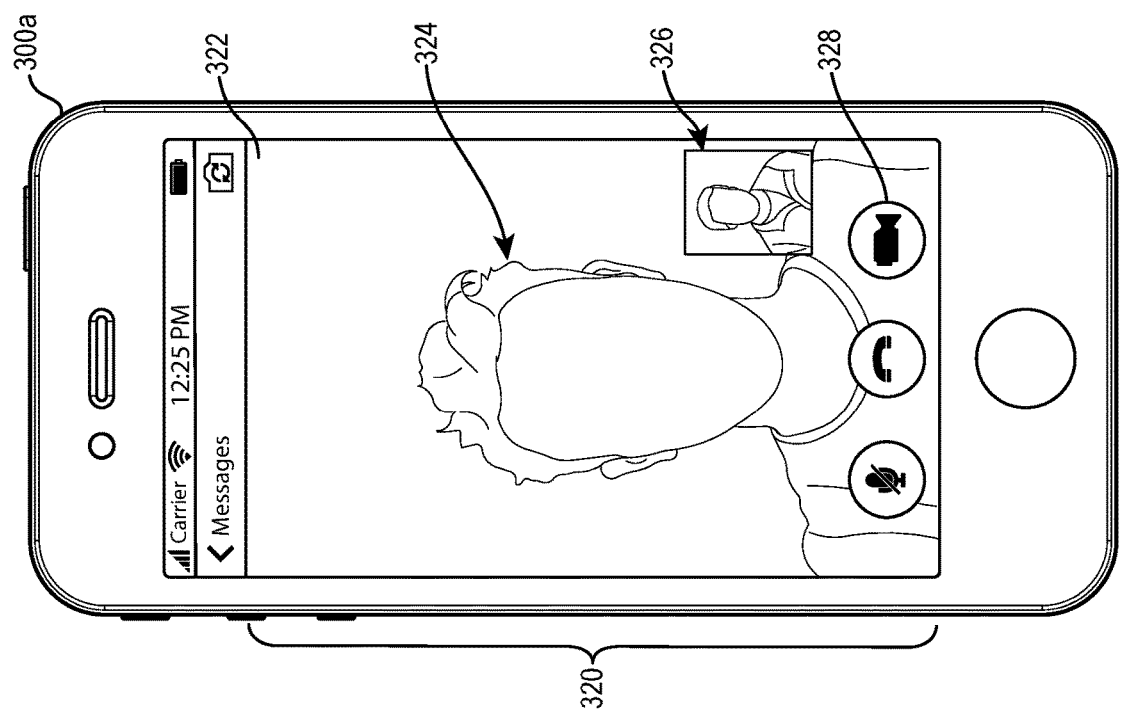
Figure 3G:
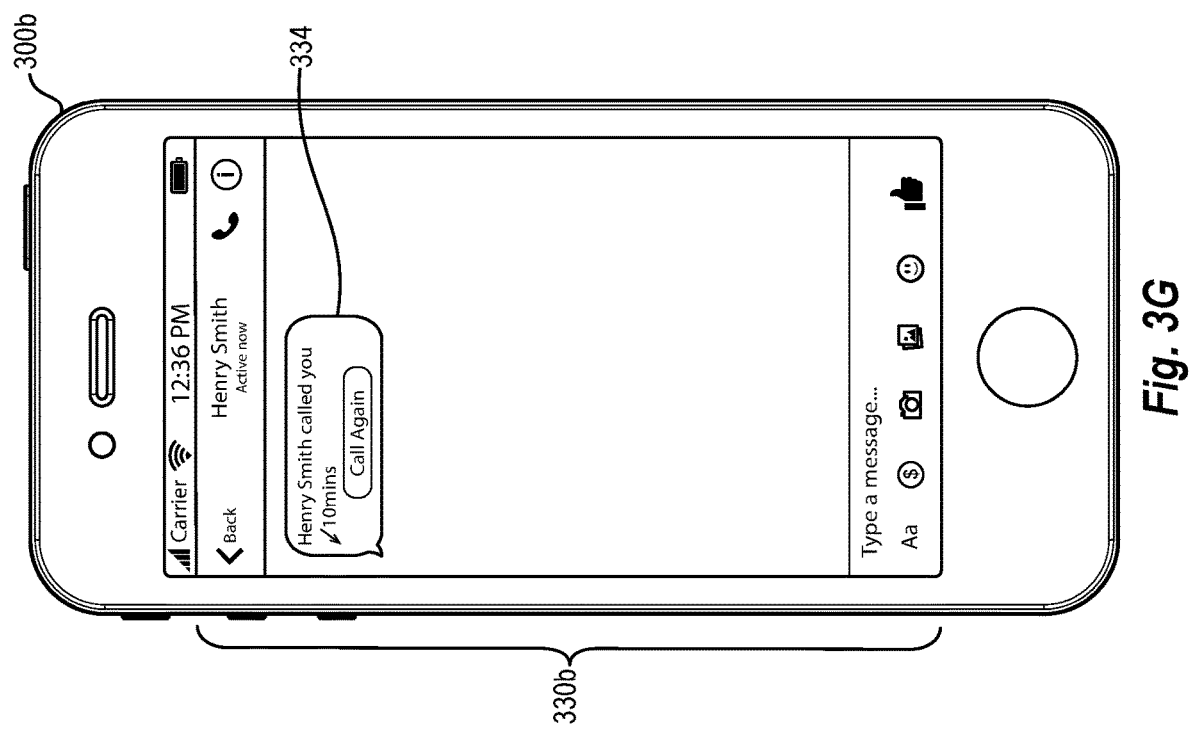

In one or more embodiments, after the electronic communication system determines that one or both users have selected to transition the phone call to a video call, the client devices 300a, 300b can end the phone call and begin a video call. Specifically, the first client device 300a and the second client device 300b terminate the phone call via the telephone network and begin streaming media via the previously established null connection. For example, FIG. 3E illustrates a video interface 320 in a messaging application 322 on the first client device 300a.

As illustrated, the video interface 320 includes a first portion 324 that displays video from another user involved in the video call. In particular, FIG. 3E illustrates that the first client device 300a receives video from the second client device 300b as part of a video call that transitioned from a phone call. When the video call begins (e.g., after the phone call terminates and the first client device 300a switches to the messaging application 322), the video interface 320 displays the received video over the previously established null connection in the first portion 324. The first client device 300a can also play audio received in connection with the received video using speakers or other audio playback device (e.g., headphones).

Additionally, the video interface 320 can also include a second portion 326 that displays video of the first user. Specifically, if the first user and the second user opt to engage in a two-way video call, the video interface 320 can display the received video in the first portion 324 and the video from the first user to the second user in the second portion 326. In at least some implementations, the second portion 326 can take up a smaller area of the video interface 320 than the first portion 324. For example, the second portion 326 can be overlaid on top of the first portion 324. Alternatively, the first portion 324 and the second portion 326 can be displayed in any display configuration, such as side-by-side, or only displaying the first portion 324 (e.g., in a one-way video call).

In one or more embodiments, the first user can interact with the video interface 320. For example, the first user can select an option to swap the content of the first portion with the content of the second portion. Swapping the content of the first portion with the content of the second portion results in displaying the video from the second user in the second portion and the video of the first user in the first portion. Alternatively, the user can select one or more options to interact with the video interface in a variety of other ways, for example, by zooming in or out on the video, drawing in the video interface, adding content to the video, adding additional users to the video call, muting the video call or ending the video call.

After the users are finished with the video call, the first user and/or the second user can select an option 328 to end the video call. Selecting the option 328 to end the video call terminates the video call and closes the video interface 320. In one or more embodiments, terminating the video call causes the first client device 300a to open a messaging interface. FIG. 3F illustrates a messaging interface 330a including a conversation between the first user and the second user. For example, the messaging interface 330a can include an automatically generated message 332 indicating that the video call between the first user and the second user took place. The second client device 300b can also display a messaging interface 330b with an automatically generated message 334 indicating that the first user called the second user, as illustrated in FIG. 3G.

Additionally, the automatically generated messages 332, 334 can include additional information, such as the time that the video call took place, the duration of the video call, and an option to call the second user again. Selecting the option to call the second user again can send a request to the second user to engage in a new video call. If the second user accepts the request to engage in a new video call with the first user, the first client device 300a can open the video interface 320 and display the new video call in the video interface 320. Similarly, the automatically generated message in the messaging interface on the second client device 300b can include an option to call the first user again.

In one or more embodiments, the messaging interface 330a, 330b also allows the users to engage in additional conversation. For example, the messaging interface 330a, 330b can allow users to enter instant messages within the conversation between the first user and the second user. To illustrate, the instant messages can include text, icons, or pictures input via a keyboard interface overlaid on top of the messaging interface 330a, 330b or integrated into the messaging interface 330a, 330b. The messaging interface 330a, 330b can display messages between the first user and the second user within the conversation according to the order in which the messages are sent.

According to one or more embodiments, the communication system also provides for upselling users to use video calls. Specifically, the communication system can leverage the ability to transition from a phone call in a phone application to a video call in a messaging application to promote the video calling ability of the messaging application to other users. For example, if the first user is in a phone call with a second user who does not have the messaging application installed, the electronic communication system can determine that the second user does not have the video call capability. The electronic communication system can then cause the first client device to display an option to invite the other user to use the messaging application while in the phone call.

Selecting the option to invite the other user to use the messaging application can cause the first client device to generate and send a text message to the second client device. In particular, the first client device can identify the phone number of the second user based on information from the phone call and send the text message to the second client device via the telephone network. The text message can include a request to download the messaging application at a specific link to be able to make video calls or to transition standard phone calls to video calls using the messaging application. The second client device can then receive the text message and display the text message in a text messaging application. The second user can then go to the link included in the text message to install the messaging application for use in future phone calls.

FIGS. 1-3G, the corresponding text, and the examples, provide a number of different systems and devices for escalating phone calls to video calls. In addition to the foregoing, embodiments can be described in terms of flowcharts comprising acts and steps in a method for accomplishing a particular result. For example, FIG. 4 illustrates a flowchart of an exemplary method in accordance with one or more embodiments.

Figure 4:
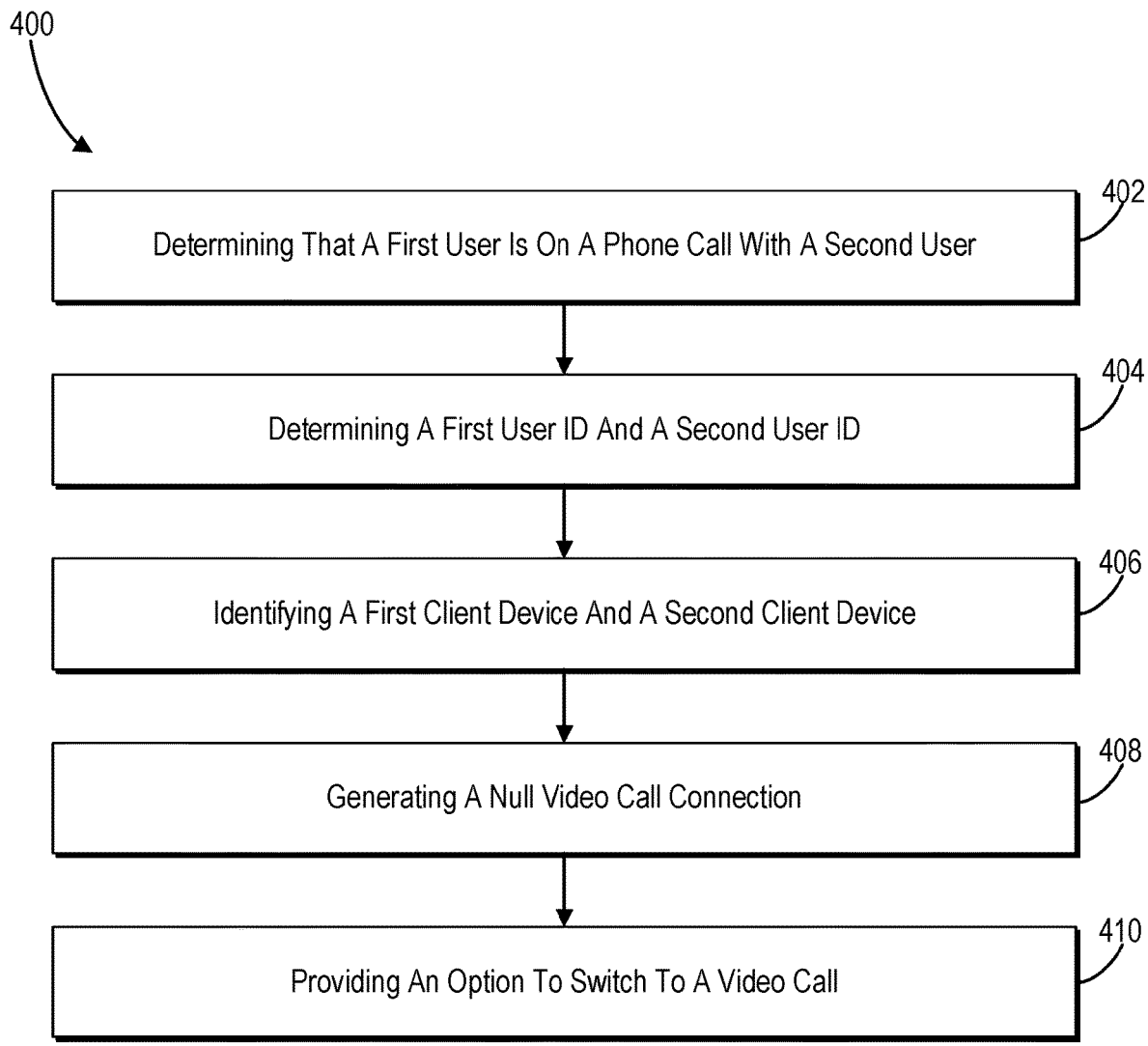
FIG. 4 illustrates a flow chart of a series of acts in a method of transitioning phone calls over a telephone network to a video call in accordance with one or more embodiments.

FIG. 4 illustrates a flowchart of a method 400 of transitioning from a phone call over a telephone network to a video call. The method 400 includes an act 402 of determining that a first user is on a phone call with a second user. For example, act 402 involves that a first user using a first client device 300a is on a phone call over a telephone network with a second user using a second client device 300b. Act 402 can involve receiving the indication of the phone call over a telephone network 112 from a messaging application 322 running on at least one client device associated with the first user.

The method 400 also includes an act 404 of determining a first user ID and a second user ID. For example, act 404 involves determining, by the electronic communication system, a first user identifier associated with the first user and a second user identifier associated with the second user. For example, the first user identifier can be associated with user account for the user. The user account can include a social networking account for the first user, the social networking account including a user ID for the first user, a phone number for the first user, relationship information for one or more co-users, device information for one or more client devices, or preferences for the user. Additionally, act 404 can involve looking up the first user identifier in a lookup table including a plurality of user identifiers mapped to phone numbers.

Act 404 can involve sending an identification request to a messaging application installed on the first client device 300a, the messaging application 322 associated with a user account corresponding to the first user identifier, and receiving, from the messaging application 322 installed on the first client device 300a in response to the identification request, the second identifier corresponding to a user account of the second user.

The method 400 further includes an act 406 of identifying a first client device 300a and a second client device 300b. For example, act 406 involves identifying the first client device 300a and the second client device 300b. Act 406 can involve sending, based on the first user identifier, a request to the first client device 300a to determine whether the first client device 300a is performing a phone call, and receiving, from the first client device 300a, a response indicating that the first client device 300a is performing the phone call. For example, act 406 can involve receiving the response indicating that the first client device is performing the phone call comprises receiving a device identifier for the first client device 300a and an application identifier for a messaging application 322 installed on the first client device 300a, the messaging application 322 associated with the video call.

Additionally, act 406 can involve sending a request to the second client device 300b to determine whether the second client device 300b is performing the phone call, and receiving, from the second client device 300b, a response indicating that the second client device 300b is performing the phone call. For example, act 406 can involve sending an identification request to a messaging application 322 installed on the first client device 300a, the messaging application 322 associated with a user account corresponding to the first user identifier, and receiving, from the messaging application 322 installed on the first client device 300a, a second identifier associated with a user account for the second user. Act 406 can also involve sending the request to a plurality of client devices associated with the user account corresponding to the first user identifier, and selecting the first client device 300a from the plurality of client devices in response to receiving the response indicating that the first client device 300a is performing the call.

The method 400 can also include determining the second user identifier based on a phone number associated with the phone call, and identifying the second client device 300b based on a user account corresponding to the second user identifier. The method 400 can also include receiving, from the first client device 300a and based on the phone number associated with the phone call, the second identifier associated with a user account for the second user.

The method 400 can include sending, based on the second user identifier, a request to the second client device 300b to determine whether the second client device 300b is performing the phone call, and receiving, from the second client device 300b, a response indicating that the second client device 300b is performing the phone call.

Additionally, the method 400 includes an act 408 of generating a null video call connection. For example, act 408 involves generating, during the phone call, a null video call connection between the first user device 300a and the second user device 300b. Act 408 can involve establishing a data connection between the first client device 300a and the second client device 300b via one or more server devices. Additionally, the null video call connection can include application identifiers for messaging applications running on the first client device 300*a* and the second client device 300*b* and device identifiers for the first client device 300*a* and the second client device 300*b*. Act 408 can also involve generating the null video call connection using a messaging application 322, wherein the first client device 300*a* comprises a first operating system and the second client device 300*b* comprises a second operating system that is different from the first operating system.

As part of act 408, or as an additional act, the method 400 can include providing visual information to the second client device 300*b* using the null video call connection. For example, the method 400 can include capturing, in response to generating the null video call connection, a preview of the video call at the first client device 300*a*, and providing the preview of the first user to the second client device 300*b*.

The method 400 also includes an act 410 of providing an option 312*b* to switch to a video call. For example, act 410 involves providing, to the first client device 300*a* after establishing the null video call connection, an option 312*b* to switch from the phone call to a video call. Act 410 can involve providing an option to transition from the phone call to the video call in a call interface 304*a* of a phone application 302*a*. To illustrate, act 410 can involve displaying the option as a dropdown notification in the call interface 304*a* as part of a notification from an operating system of the first client device 300*a*. Act 410 can involve embedding the option in the call interface 304*a*. Act 410 can involve overlaying the option 312*b* on top of the call interface 304*a* based on permissions associated with the messaging application 322.

The method 400 can also include receiving, from the first client device 300*a* and in response to the option provided to the first client device, a request to switch the phone call to the video call, and switching the null video call connection to an active video call, the active video call comprising a video stream from the first client device 300*a* to the second client device 300*b*. Additionally, the null video call connection can include audio with the video stream. The video call can be a one-way video call from the first client device 300*a* to the second client device 300*b* or a two-way video call between the first client device 300*a* and the second client device 300*b*.

The method 400 can further include providing, to the second client device 300*b*, an option to switch the phone call to a video call from the second user to the first user, receiving, from the second client device 300*b* and in response to the option provided to the second client device 300*b*, a request to switch the phone call to the video call, and providing a video stream from the second client device 300*b* to the first client device 300*a* based on the null video call connection.

Figure 5:
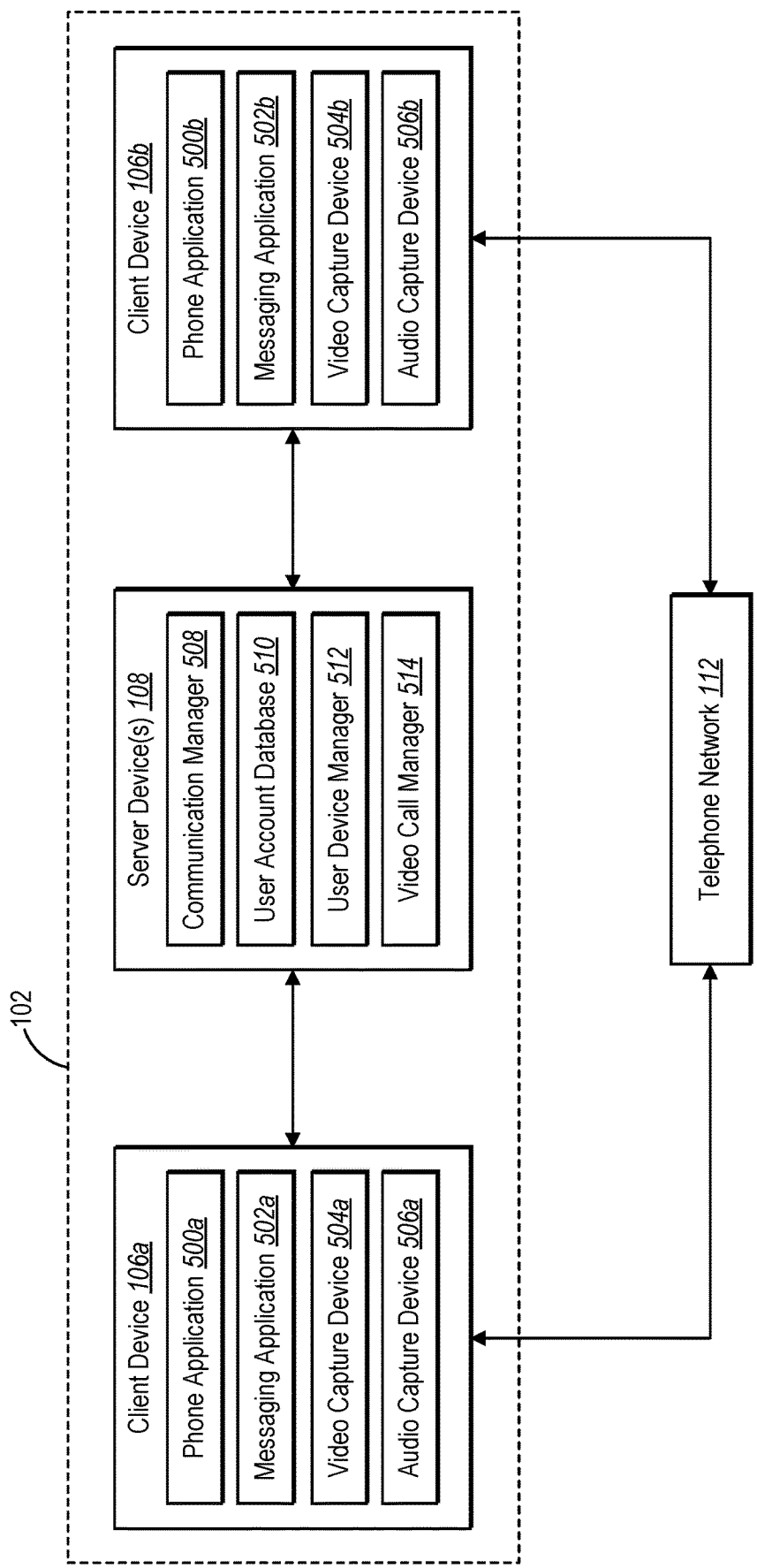
FIG. 5 illustrates a detailed schematic diagram of the environment of FIG. 1 in accordance with one or more embodiments.

FIG. 5 illustrates a schematic diagram illustrating additional details of the environment of FIG. 1. As shown, the communication system 102 includes server device(s) 108, a first client device 106*a*, and a second client device 106*b*. The environment also includes a telephone network 112. The communication system 102 allows users to transition from a phone call over the telephone network 112 to a video call via the server device(s) 108. Additionally, the communication system 102 allows users to exchange messages (e.g., instant messages) with other users via the respective client devices.

As shown, the devices in the communication system 102 of FIG. 5 include various components. For example, FIG. 5 illustrates that the first client device 106*a* and second client device 106*b* (collectively referred to as "client devices 106", as previously mentioned) each include a phone application 500*a*, 500*b*, a messaging application 502*a*, 502*b*, a video capture device 504*a*, 504*b*, and an audio capture device 506*a*, 506*b*. The server device(s) can include a communication manager 508, a user account database 510, a user device manager 512, and a video call manager 514 (e.g., as part of the electronic communication system 109, as illustrated in FIG. 1). The telephone network 112 is illustrated as a component separate from the communication system 102, though other embodiments of the communication system 102 may include some or all of the components/functionality of the telephone network 112.

The components can include software, hardware, or both. For example, the components can include computer instructions stored on a non-transitory computer-readable storage medium and executable by at least one processor of the client devices 106 or the server device(s) 108. When executed by the at least one processor, the computer-executable instructions can cause the client devices or the server device(s) 108 to perform the methods and processes described herein. Alternatively, the components can include hardware, such as a special purpose processing device to perform a certain function or group of functions. Additionally or alternatively, the components can include a combination of computer-executable instructions and hardware.

In one or more embodiments, the phone applications 500*a*, 500*b* and messaging applications 502*a*, 502*b* on the first client device 106*a* and the second client device 106*b* are native applications installed on the client devices. For example, the phone applications 500*a*, 500*b* and the messaging applications 502*a*, 502*b* on one or both client devices 106 may be mobile applications that install and run on a mobile device, such as a smartphone or a tablet. Alternatively, one or more of the applications may be a desktop application, widget, or other form of a native computer program that runs on a desktop device or laptop device. Alternatively, one or more of the applications may be a remote application, such as a web application executed within a web browser, that the client devices access.

As mentioned, the client devices 106 include a phone application 500*a*, 500*b*. The phone application 500*a*, 500*b* allows a user to engage in phone calls with another user via the telephone network. For example, the phone application 500*a*, 500*b* can include an application that allows a user to communicate with another user via respective client devices using phone numbers associated with the client devices. To illustrate, the phone application 500*a*, 500*b* can allow the user to dial a phone number of another user to initiate a phone call with the other user over the telephone network 112 using a telephone communication technology (e.g., cellular technology).

Additionally, the phone application 500*a*, 500*b* can allow a user to access contact information for other users. For example, the phone application 500*a*, 500*b* can provide access to a contact list stored on the user's client device. The user and/or the client device can access the contact list to obtain phone numbers or other contact information about other users in the contact list. In one or more embodiments, other applications (such as the messaging application 502*a*, 502*b*) can also access the contact list via the phone application 500*a*, 500*b* while the phone application 500*a*, 500*b* is in use (e.g., while the client device is involved in a phone call).

The client devices 106 also include a messaging application 502*a*, 502*b* to facilitate communication between two or more users via the server device(s). In particular, the messaging application 502*a*, 502*b* allows a user to communicate with one or more other users in a variety of ways over a data connection. For example, the messaging application 502a, 502b can allow the user to communicate with another user over a network connection such as the Internet. To illustrate, the first user associated with the first client device 106a can use the messaging application 502a to communicate with the second user associated with the second client device 106b, the second user also using the messaging application 502b.

As mentioned, the messaging application 502a, 502b allows users to communicate with each other in a variety of ways. For example, the messaging application 502a, 502b allows a user to engage in instant messaging (e.g., text). Additionally, the messaging application 502a, 502b can allow a user to engage in a video call with another user (e.g., by sending and receiving video and audio). In one or more embodiments, the messaging application 502a, 502b allows the user to engage in messaging and video in connection with a conversation between the user and one or more additional users.

The client devices 106 also include a video capture device 504a, 504b and an audio capture device 506a, 506b. The video capture device 504a, 504b captures images and/or video for transmitting to another user. The audio capture device 506a, 506b captures audio for transmitting to the other user in connection with the video and/or in connection with a phone call. For example, the messaging application 502a, 502b can leverage the video capture device 504a, 504b and the audio capture device 506a, 506b to capture media for transmitting over a data connection to another client device via the server device(s) 108.

As mentioned, the server device(s) 108 include a communication manager 508. The communication manager 508 facilitates communication with the client devices 106. In particular, the communication manager 508 communicates with the messaging applications 502a, 502b on the client devices 106 to obtain information about the client devices 106, the messaging applications 502a, 502b, the users associated with the client devices 106, and/or information about other applications running on the client devices. For example, the communication manager 508 can identify device IDs, application IDs, login information for the users, phone numbers, and/or whether a client device is currently involved in a phone call. The communication manager 508 can also provide the obtained information to one or more other components of the server device(s) 108.

The communication manager 508 can also communicate with the client devices 106 to facilitate transmission of data between the client devices 106. Specifically, while transitioning the client devices 106 from a phone call to a video call, the communication manager 508 can communicate with the client devices 106 to establish a data connection (i.e., the null connection) between the client devices 106. Additionally, the communication manager 508 can facilitate in causing the client devices 106 to terminate the phone call and begin transmitting media via the established data connection.

The user account database 510 stores user account information for a plurality of users. Specifically, the user account database 510 can store user account information associated with user accounts of a social networking system (such as, but not limited to, FACEBOOK™). The user account information can include information received from one or more client devices of a user, including user IDs, user login information, device IDs, application IDs, phone numbers associated with user accounts, and relationships between users (e.g., based on social graphs, as explained in more detail with respect to FIG. 8). The user account database 510 can provide information from a user account to the communication manager and/or other components of the server device(s) 108 to allow the communication system 102 to escalate regular phone calls over a telephone network 112 to video calls. For instance, the user account database 510 can provide a user ID associated with a phone number in connection with a phone call.

As previously described, a user can use a plurality of client devices in connection with a social networking system. The user device manager 512 manages the client devices associated with a user account in connection with attempts to transition a phone call to a video call. For example, a user can register each client device from a plurality of client devices with the user device manager 512 by logging into the user's account via the different client devices. The user device manager 512 can receive and store device IDs for each of the client devices. Thus, when attempting to identify a client device involved in a phone call, the user device manager 512 can identify a plurality of client devices with device IDs associated with a user account using the user account database 510.

In addition, the server device(s) 108 include a video call manager 514 to facilitate the initiation and performance of video calls between two or more users. In particular, the video call manager 514 can use information from the communication manager, the user account database 510, and the user device manager 512 to determine that two or more devices are able to transition a phone call to a video call. Additionally, the video call manager 514 can facilitate the establishment of a null connection between the corresponding client devices 106 of the users with the appropriate information. When the communication system 102 determines that the users want to transition the phone call to a video call, the video call manager 514 can also facilitate the client devices 106 in streaming media using the previously established null connection.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
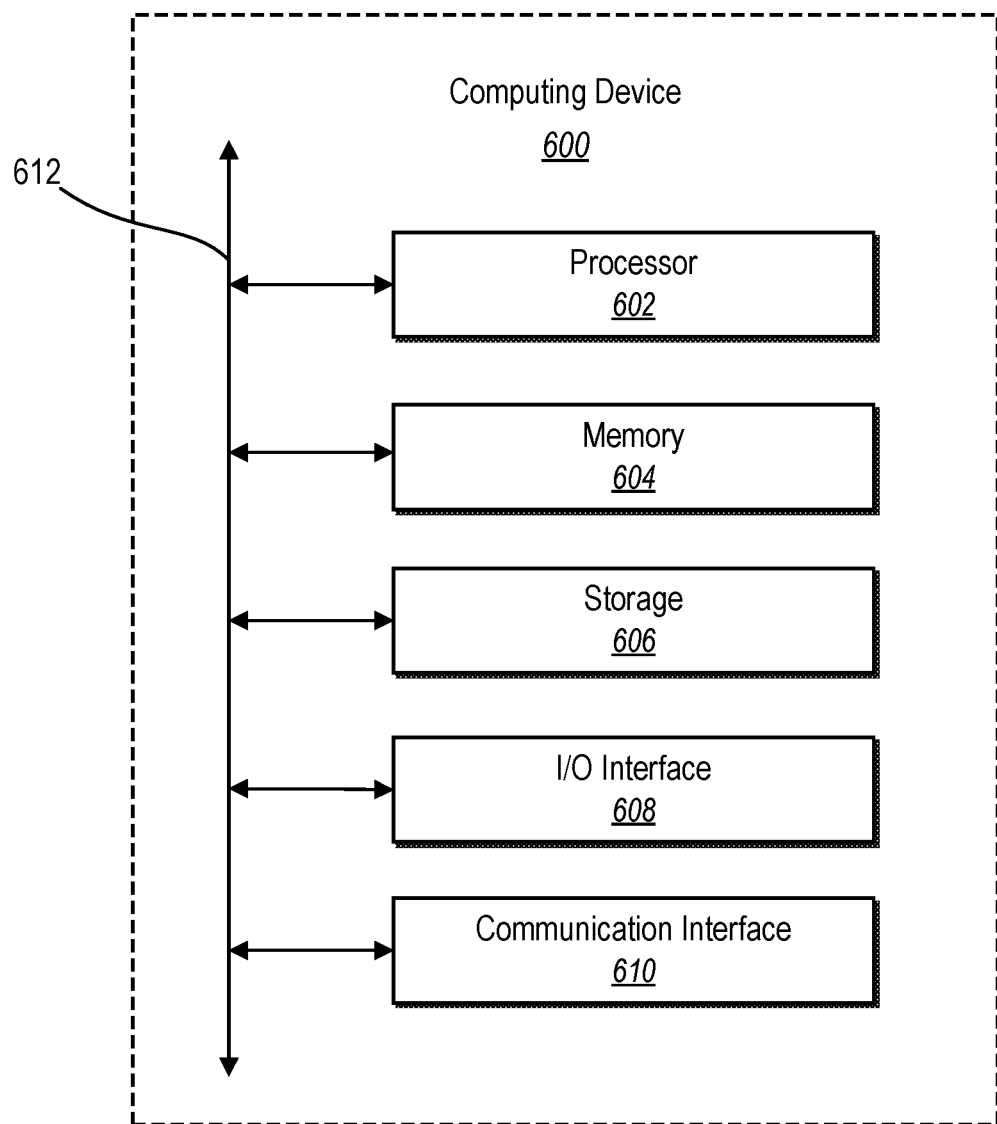
FIG. 6 illustrates a block diagram of an example computing device in accordance with one or more embodiments.

FIG. 6 illustrates a block diagram of exemplary computing device 600 that may be configured to perform one or more of the processes described above. One will appreciate that one or more computing devices such as the computing device 600 may implement the communication system. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage device 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touchscreen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the communication system can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 7:
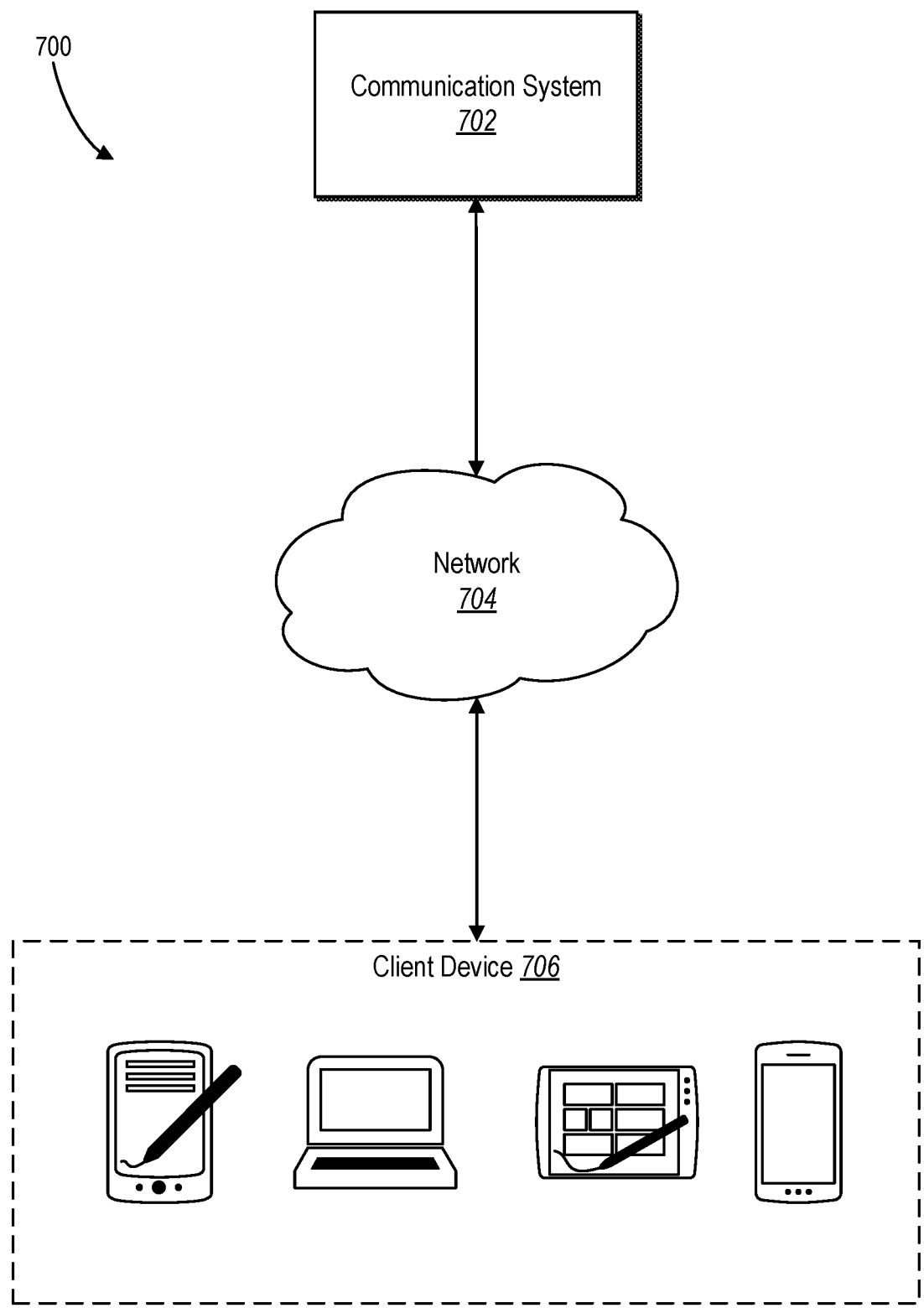
FIG. 7 illustrates an example network environment of a communication system in accordance with one or more embodiments.

FIG. 7 illustrates an example network environment 700 of a social-networking system. Network environment 700 includes a client system 706, and a communication system 702 connected to each other by a network 704. Although FIG. 7 illustrates a particular arrangement of client system 706, communication system 702, and network 704, this disclosure contemplates any suitable arrangement of client system 706, communication system 702 and network 704. As an example and not by way of limitation, two or more of client system 706, and communication system 702 may be connected to each other directly, bypassing network 704. As another example, two or more of client system 706, communication system 702 may be physically or logically co-located with each other in whole or in part. Moreover, although FIG. 7 illustrates a particular number of client systems 706, communication systems 702, and networks 704, this disclosure contemplates any suitable number of client systems 706, communication systems 702, and networks 704. As an example and not by way of limitation, network environment 700 may include multiple client system 706, communication systems 702, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706 and communication system 702 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include any of the computing devices discussed above in relation to FIG. 7. A client system 706 may enable a network user at client system 706 to access network 704. A client system 706 may enable its user to communicate with other users at other client systems 706.

In particular embodiments, client system 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, Communication system 702 may be a network-addressable computing system that can host an online social network, such as a social-networking system. Communication system 702 may generate, store, receive, and send social-networking data, such as, for example, user-profile data, concept-profile data, social-graph information, or other suitable data related to the online social network. Communication system 702 may be accessed by the other components of network environment 700 either directly or via network 704. In particular embodiments, communication system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, communication system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 706 or a communication system 702 to manage, retrieve, modify, add, or delete, the information stored in data store.

In particular embodiments, communication system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Communication system 702 may provide users of the online social network the ability to communicate and interact with other users. In particular embodiments, users may join the online social network via communication system 702 and then add connections (e.g., relationships) to a number of other users of communication system 702 whom they want to be connected to. Herein, the term "friend" may refer to any other user of communication system 702 with whom a user has formed a connection, association, or relationship via communication system 702.

In particular embodiments, communication system 702 may provide users with the ability to take actions on various types of items or objects, supported by communication system 702. As an example and not by way of limitation, the items and objects may include groups or social networks to which users of communication system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in communication system 702 or by an external system of third-party system, which is separate from communication system 702 and coupled to communication system 702 via a network 704.

In particular embodiments, communication system 702 may be capable of linking a variety of entities. As an example and not by way of limitation, communication system 702 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating communication system 702. In particular embodiments, however, communication system 702 and third-party systems may operate in conjunction with each other to provide social-networking services to users of communication system 702. In this sense, communication system 702 may provide a platform, or backbone, which other systems, such as third-party systems, may use to provide social-networking services and functionality to users across the Internet.

In particular embodiments, communication system 702 also includes user-generated content objects, which may enhance a user's interactions with communication system 702. User-generated content may include anything a user can add, upload, send, or "post" to communication system 702. As an example and not by way of limitation, a user communicates posts to communication system 702 from a client system 706. Posts may include data such as status updates or other textual data, location information, photos, videos, links, music or other similar data or media. Content may also be added to communication system 702 by a third-party through a "communication channel," such as a newsfeed or stream.

In particular embodiments, communication system 702 may include a variety of servers, sub-systems, programs, modules, logs, and data stores. In particular embodiments, communication system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Communication system 702 may also include suitable components such as network interfaces, security mechanisms, load balancers, failover servers, management-and-network-operations consoles, other suitable components, or any suitable combination thereof. In particular embodiments, communication system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking communication system 702 to one or more client systems 706 via network 704. The web server may include a mail server or other messaging functionality for receiving and routing messages between communication system 702 and one or more client systems 706. An API-request server may allow a third-party system to access information from communication system 702 by calling one or more APIs. An action logger may be used to receive communications from a web server about a user's actions on or off communication system 702. In conjunction with the action log, a third-party-content-object log may be maintained of user exposures to third-party-content objects. A notification controller may provide information regarding content objects to a client system 706. Information may be pushed to a client system 706 as notifications, or information may be pulled from client system 706 responsive to a request received from client system 706. Authorization servers may be used to enforce one or more privacy settings of the users of communication system 702. A privacy setting of a user determines how particular information associated with a user can be shared. The authorization server may allow users to opt in to or opt out of having their actions logged by communication system 702 or shared with other systems, such as, for example, by setting appropriate privacy settings. Third-party-content-object stores may be used to store content objects received from third parties. Location stores may be used for storing location information received from client systems 706 associated with users. Advertisement-pricing modules may combine social information, the current time, location information, or other suitable information to provide relevant advertisements, in the form of notifications, to a user.

FIG. 8 illustrates example social graph 800. In particular embodiments, communication system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a communication system 702 or client system 706 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of communication system 702. As an example and not by way of limitation, a user may be an individual (human user), an entity (e.g., an enterprise, business, or third-party application), or a group (e.g., of individuals or entities) that interacts or communicates with or over communication system 702. In particular embodiments, when a user registers for an account with communication system 702, communication system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with communication system 702. In particular embodiments, a user node 802 may be associated with information provided by a user or information gathered by various systems, including communication system 702. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with communication system 702 or a third-party website associated with a web-application server); an entity (such as, for example, a person, business, group, sports team, or celebrity); a resource (such as, for example, an audio file, video file, digital photo, text file, structured document, or application) which may be located within communication system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including communication system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to communication system 702. Profile pages may also be hosted on third-party websites associated with a third-party server. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 706 to send to communication system 702 a message indicating the user's action. In response to the message, communication system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, communication system 702 may send a "friend request" to the second user. If the second user confirms the "friend request," communication system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node

804. As an example and not by way of limitation, as illustrated in FIG. 8, a user may "like," "attended," "played," "listened," "cooked," "worked at," or "watched" a concept, each of which may correspond to a edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, communication system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, communication system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, communication system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, communication system 702 may create an edge 806 between a user node 802 and a concept node 804 in social graph 800. As an example and not by way of limitation, a user viewing a concept-profile page (such as, for example, by using a web browser or a special-purpose application hosted by the user's client system 706) may indicate that he or she likes the concept represented by the concept node 804 by clicking or selecting a "Like" icon, which may cause the user's client system 706 to send to communication system 702 a message indicating the user's liking of the concept associated with the concept-profile page. In response to the message, communication system 702 may create an edge 806 between user node 802 associated with the user and concept node 804, as illustrated by "like" edge 806 between the user and concept node 804. In particular embodiments, communication system 702 may store an edge 806 in one or more data stores. In particular embodiments, an edge 806 may be automatically formed by communication system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on communication system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, communication system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through communication system 702) or RSVP (e.g., through communication system 702) to an event associated with the advertisement. In addition or as an alternative, an advertisement may include social-networking-system context directed to the user. As an example and not by way of limitation, an advertisement may display information about a friend of the user within communication system 702 who has taken an action associated with the subject matter of the advertisement.

In particular embodiments, communication system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, communication system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, communication system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the communication system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, communication system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, communication system 702 may calculate a coefficient based on a user's actions. Communication system 702 may monitor such actions on the online social network, on a third-party system, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, communication system 702 may calculate a coefficient based on the user's actions with particular types of content. The content may be associated with the online social network, a third-party system, or another suitable system. The content may include users, profile pages, posts, news stories, headlines, instant messages, chat room conversations, emails, advertisements, pictures, video, music, other suitable objects, or any combination thereof. Communication system 702 may analyze a user's actions to determine whether one or more of the actions indicate an affinity for subject matter, content, other users, and so forth. As an example and not by way of limitation, if a user may make frequently posts content related to "coffee" or variants thereof, communication system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, communication system 702 may calculate a coefficient based on the type of relationship between particular objects. Referencing the social graph 800, communication system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, communication system 702 may determine that the user has a higher coefficient with respect to the first photo than the second photo because having a tagged-in-type relationship with content may be assigned a higher weight and/or rating than having a like-type relationship with content. In particular embodiments, communication system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, communication system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, communication system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 706 of the user). A first user may be more interested in other users or concepts that are closer to the first user. As an example and not by way of limitation, if a user is one mile from an airport and two miles from a gas station, communication system 702 may determine that the user has a higher coefficient for the airport than the gas station based on the proximity of the airport to the user.

In particular embodiments, communication system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, communication system 702 may provide information that is relevant to user's interests and current circumstances, increasing the likelihood that they will find such information of interest. In particular embodiments, communication system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, communication system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, communication system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system (e.g., via an API or other communication channel), or from another suitable system. In response to the request, communication system 702 may calculate the coefficient (or access the coefficient information if it has previously been calculated and stored). In particular embodiments, communication system 702 may measure an affinity with respect to a particular process. Different processes (both internal and external to the online social network) may request a coefficient for a particular object or set of objects. Communication system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by communication system 702 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, communication system 702 may send a request to the data store for the object. The request may identify the user associated with the request and may only be sent to the user (or a client system 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method, comprising:
    determining, by an electronic communication system, that a first user using a first client device is on a phone call over a telephone network with a second user using a second client device;
    determining, by the electronic communication system, a first user identifier associated with the first user and a second user identifier associated with the second user;
    identifying, by the electronic communication system, the first client device and the second client device;
    generating, during the phone call, a null video call connection between the first user device and the second user device; and
    providing, to the first client device after establishing the null video call connection, an option to switch the phone call to a video call.

2. The method as recited in claim 1, wherein identifying the first client device comprises:
    sending, based on the first user identifier, a request to the first client device to determine whether the first client device is performing a phone call; and
    receiving, from the first client device, a response indicating that the first client device is performing the phone call.

3. The method as recited in claim 2, wherein identifying the first client device comprises:
    sending the request to a plurality of client devices associated with a user account corresponding to the first user identifier; and
    selecting the first client device from the plurality of client devices in response to receiving the response indicating that the first client device is performing the phone call.

4. The method as recited in claim 2, wherein identifying the second client device comprises:
    sending, based on the second user identifier, a request to the second client device to determine whether the second client device is performing the phone call; and receiving, from the second client device, a response indicating that the second client device is performing the phone call.

5. The method as recited in claim 4, wherein:
determining the second user identifier associated with the second user comprises determining the second user identifier based on a phone number associated with the phone call; and
identifying the second client device comprises identifying the second client device based on a user account corresponding to the second user identifier.

6. The method as recited in claim 2, wherein receiving the response indicating that the first client device is performing a phone call comprises receiving a device identifier for the first client device and an application identifier for a messaging application installed on the first client device, wherein the messaging application is associated with the video call.

7. The method as recited in claim 2, wherein sending the request to the second client device comprises:
sending an identification request to a messaging application installed on the first client device, the messaging application associated with a user account corresponding to the first user identifier; and
receiving, from the messaging application installed on the first client device in response to the identification request, the second identifier corresponding to a user account of the second user.

8. The method as recited in claim 1, wherein generating the null video call connection between the first user device and the second user device comprises generating the null video call connection using a messaging application, wherein the first client device comprises a first operating system and the second client device comprises a second operating system that is different from the first operating system.

9. The method as recited in claim 1, further comprising:
receiving, from the first client device and in response to the option provided to the first client device, a request to switch the phone call to the video call; and
switching the null video call connection to an active video call, the active video call comprising a video stream from the first client device to the second client device.

10. The method as recited in claim 1, further comprising:
providing, to the second client device, an option to switch the phone call to a video call from the second user to the first user;
receiving, from the second client device and in response to the option provided to the second client device, a request to switch the phone call to the video call; and
providing a video stream from the second client device to the first client device based on the null video call connection.

11. The method as recited in claim 1, further comprising:
capturing, in response to generating the null video call connection, a preview of the video call at the first client device; and
providing the preview of the video call to the second client device.

12. A system, comprising:
at least one processor; and
a non-transitory computer readable storage medium comprising instructions that, when executed by the at least one processor, cause the system to:
determine that a first user using a first client device is on a phone call over a telephone network with a second user using a second client device;
determine a first user identifier associated with the first user and a second user identifier associated with the second user;
identify the first client device and the second client device;
generate, during the phone call, a null video call connection between the first user device and the second user device; and
provide, to the first client device after establishing the null video call connection, an option to switch the phone call to a video call.

13. The system as recited in claim 12, further comprising instructions that, when executed by the at least one processor, cause the system to identify the first client device and the second client device by:
sending a request to the first client device to determine whether the first client device is performing a phone call;
receiving, from the first client device, a response indicating that the first client device is performing the phone call;
sending a request to the second client device to determine whether the second client device is performing a phone call; and
receiving, from the second client device, a response indicating that the second client device is performing the phone call.

14. The system as recited in claim 13, further comprising instructions that, when executed by the at least one processor, cause the system to identify the first client device by:
sending the request to a plurality of client devices associated with a user account corresponding to the first user identifier; and
selecting the first client device from the plurality of client devices in response to receiving the response indicating that the first client device is performing the phone call.

15. The system as recited in claim 13, further comprising instructions that, when executed by the at least one processor, cause the system to identify the second client device by:
determining the second user identifier based on a phone number associated with the phone call; and
sending the request to a plurality of client devices associated with a user account corresponding to the second user identifier; and
selecting the second client device from the plurality of client devices in response to receiving the response indicating that the second client device is performing the phone call.

16. The system as recited in claim 12, further comprising instructions that, when executed by the at least one processor, cause the system to:
receive, from the first client device and in response to the option to the first client device, a request to switch the phone call to the video call;
provide, to the second client device, an option to switch the phone call to a video call from the second user to the first user;
receive, from the second client device and in response to the option to the second client device, a request to switch the phone call to the video call; and
switch the null video call connection to an active video call, the active video call comprising a two-way video stream between the first client device and the second client device.

17. The system as recited in claim 16, further comprising instructions that, when executed by the at least one processor, cause the system to switch the null video call connection to the active video call by transmitting the two-way video stream between the first client device and the second client device within a messaging application.

18. A non-transitory computer readable medium storing instructions thereon that, when executed by at least one processor, cause a computer system to:
- determine that a first user using a first client device is on a phone call over a telephone network with a second user using a second client device;
- determine a first user identifier associated with the first user and a second user identifier associated with the second user;
- identify the first client device and the second client device;
- generate, during the phone call, a null video call connection between the first user device and the second user device; and
- provide, to the first client device after establishing the null video call connection, an option to switch the phone call to a video call.

19. The non-transitory computer readable medium of claim 18, further comprising instructions that, when executed by the at least one processor, cause the computer system to:
- receive, from the first client device, a request to switch the phone call to the video call after generating the null video call connection;
- terminate the phone call between the first user and the second user over the telephone network; and
- provide the video call from the first user device to the second user device using the null video call connection.

20. The non-transitory computer readable medium of claim 19, further comprising instructions that, when executed by the at least one processor, cause the computer system to:
- terminate the phone call between the first user and the second user within a first client application; and
- provide the video call from the first user device to the second user device within a second client application.

* * * * *